United States Patent
Ishizaki

(10) Patent No.: US 8,855,512 B2
(45) Date of Patent: *Oct. 7, 2014

(54) LOAD ABNORMALITY DETECTION APPARATUS PERFORMING ACCURATE JUDGMENT OF CAUSE OF ABNORMALITY

(71) Applicant: Yuusuke Ishizaki, Kanagawa (JP)

(72) Inventor: Yuusuke Ishizaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,477

(22) Filed: Aug. 26, 2013

(65) Prior Publication Data

US 2013/0343772 A1    Dec. 26, 2013

Related U.S. Application Data

(63) Continuation of application No. 13/049,983, filed on Mar. 17, 2011, now Pat. No. 8,543,017.

(30) Foreign Application Priority Data

Mar. 18, 2010   (JP) ................................. 2010-063209
Feb. 24, 2011   (JP) ................................. 2011-038084

(51) Int. Cl.
| | | |
|---|---|---|
| *G03G 15/00* | (2006.01) | |
| *H02P 29/02* | (2006.01) | |
| *G03G 15/16* | (2006.01) | |
| *H02P 5/00* | (2006.01) | |
| *G03G 15/01* | (2006.01) | |
| *H02P 5/46* | (2006.01) | |

(52) U.S. Cl.
CPC ....... *H02P 5/00* (2013.01); *G03G 15/70* (2013.01); *G03G 2215/0129* (2013.01); *H02P 29/021* (2013.01); *G03G 15/1615* (2013.01); *G03G 2221/1642* (2013.01); *G03G 15/55* (2013.01); *G03G 15/0131* (2013.01); *G03G 15/5054* (2013.01); *H02P 5/46* (2013.01)

USPC .............................................................. 399/36

(58) Field of Classification Search
USPC ..................................... 399/36, 33, 66, 67, 68
See application file for complete search history.

(56) References Cited

U.S. PATENT DOCUMENTS

| | | | | |
|---|---|---|---|---|
| 5,689,756 A | * | 11/1997 | Taki et al. ........................ | 399/33 |
| 2003/0223768 A1 | | 12/2003 | Takigawa ......................... | 399/66 |
| 2010/0239293 A1 | * | 9/2010 | Ishizaki et al. .................. | 399/66 |

FOREIGN PATENT DOCUMENTS

| | | | |
|---|---|---|---|
| EP | 1314804 | | 5/2003 |
| JP | 61006675 A | * | 1/1986 |
| JP | 2003-166135 | | 6/2003 |
| JP | 2005-331630 | | 12/2005 |
| JP | 2006-042483 | | 2/2006 |

* cited by examiner

Primary Examiner — Quana M Grainger
(74) Attorney, Agent, or Firm — IPUSA, PLLC

(57) ABSTRACT

A load abnormality detection apparatus includes first and second rotational members that contact each other directly or via a recording medium interposed therebetween, a first motor that drives the first rotational member and is controlled by a first drive current and a second motor that drives the second rotational member and is controlled by a second drive current. The load abnormality detection apparatus further includes a current detection part configured to detect the first and second drive currents, a first judgment part configured to judge whether the first drive current is within a first range, a second judgment part configured to judge whether the second drive current is within a second range and an abnormality detection part configured to detect a load abnormality of the first and/or second rotational members and identify a cause of the load abnormality based on results from the first and second judgment parts.

18 Claims, 20 Drawing Sheets

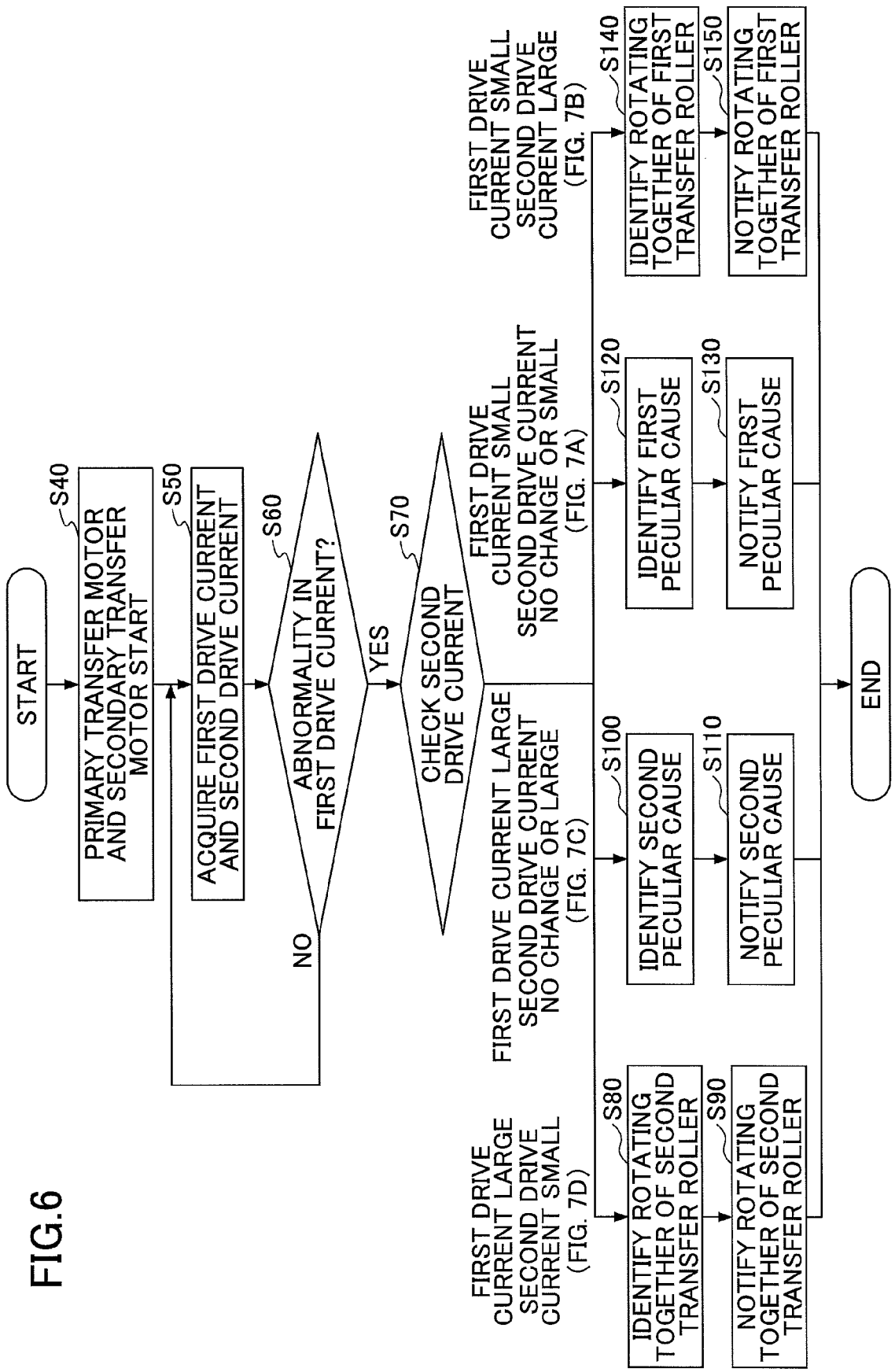

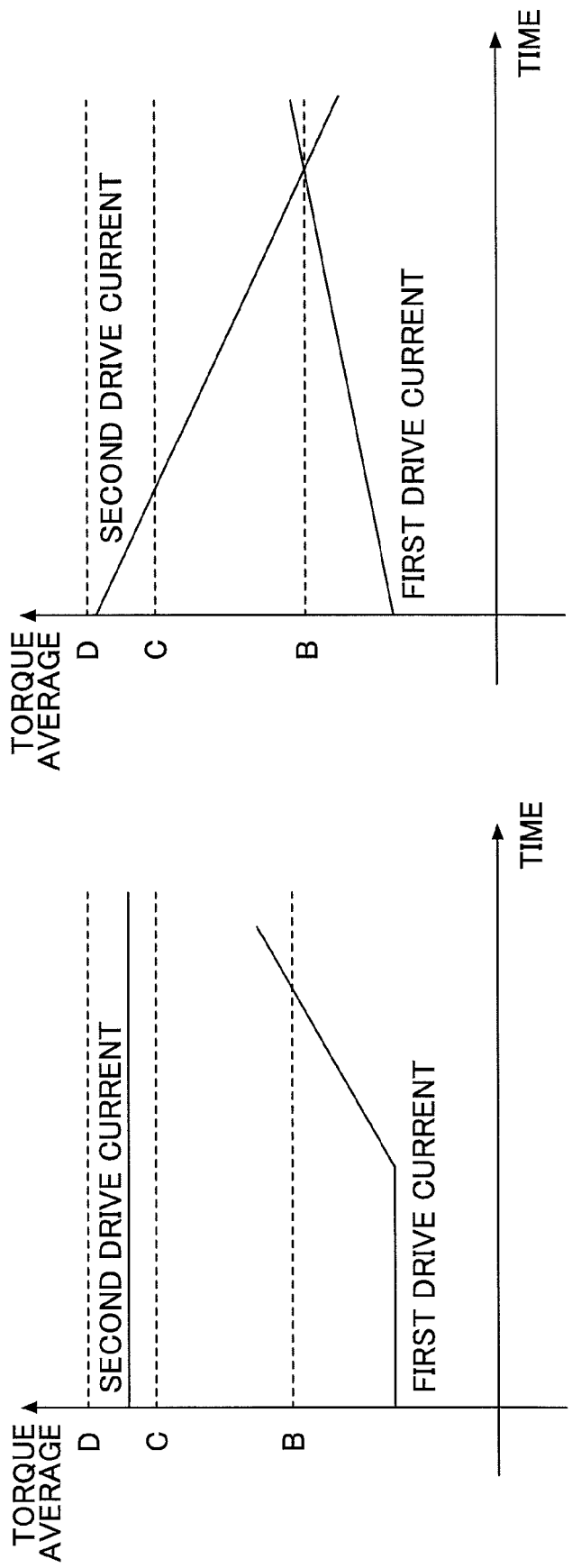

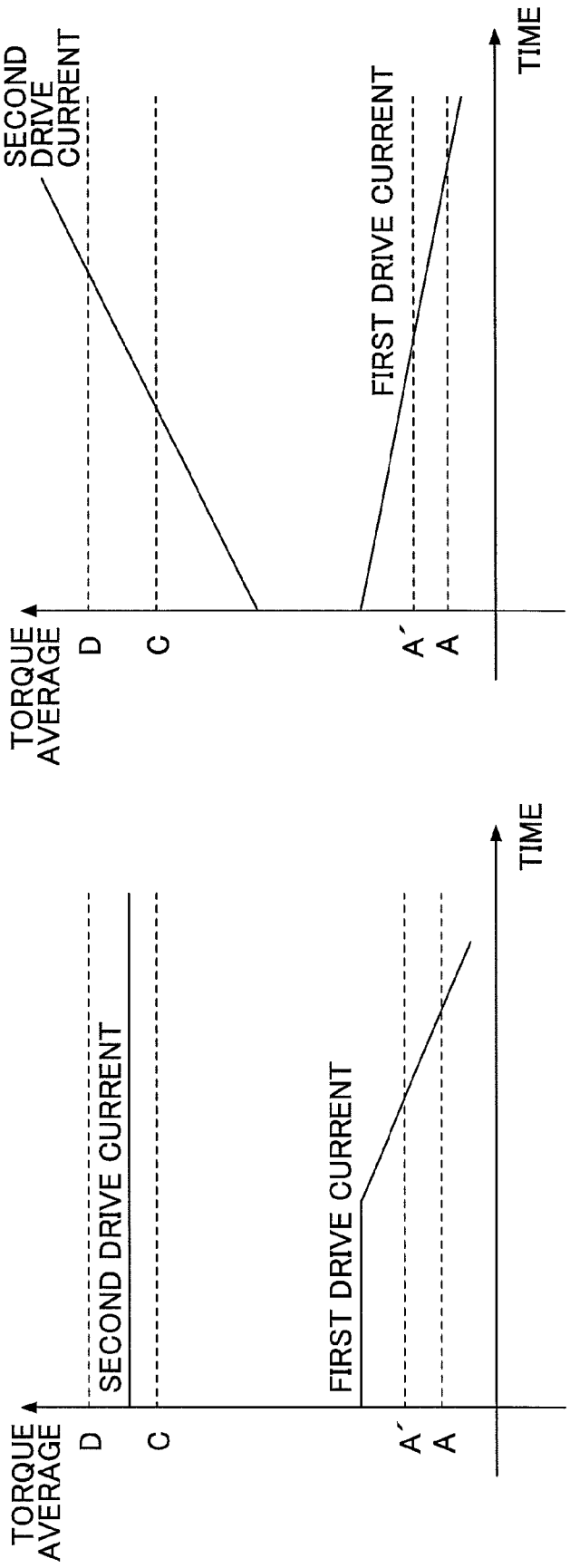

LOAD ABNORMALITY DETECTION APPARATUS PERFORMING ACCURATE JUDGMENT OF CAUSE OF ABNORMALITY

CROSS-REFERENCE TO RELATED APPLICATION

This application is a continuation patent application of, and claims the benefit of and priority to U.S. patent application Ser. No. 13/049,983 filed on Mar. 17, 2011, which is based on and claims the benefit of priority of Japanese Applications Nos. 2010-063209 filed on Mar. 18, 2010 and 2011-038084 filed on Feb. 24, 2011, the entire contents of which are incorporated herein by reference.

BACKGROUND OF THE INVENTION

1. Field of the Invention

The present invention relates to a technique to judge a cause of an abnormality generated in a structure having a plurality of motors acting with each other.

2. Description of Related Art

Japanese Laid-Open Patent Application No. 2003-166135 suggests a technique to detect an abnormality in a load applied to a motor. In this abnormality detection technique, it is judged that an abnormality occurs in a load applied to a motor when a detected current flowing through the motor exceeds a threshold value. This patent document also discloses a technique to detect an existence of an abnormality from changes in a value of the current flowing through for the purpose of detecting an abnormality in a load being applied to the motor.

The technology in which an existence of abnormality in a load is determined based on only whether a current value exceeds a threshold value is effective in a case where the load is driven independently. However, for example, in a case where a primary transfer belt and a secondary transfer roller of an image forming apparatus that are driven by separate drive sources, it may be difficult to make an accurate determination because interference between the belt and the roller may give influences to the load conditions of both the belt and the roller. For example, if a primary transfer belt and a surface of a secondary roller are rotationally moved at the same speed and if the secondary roller expands due to a temperature rise, the primary transfer belt may be moved together with the secondary transfer roller because the moving speed of the surface of the secondary transfer belt is increased even when the drive motors for driving the primary transfer belt and the secondary transfer roller are controlled to maintain the same speed. In such a case, the load applied to the drive motor for driving the secondary transfer roller is increased by an amount corresponding to a force to move the secondary transfer roller. On the other hand, the drive motor for driving the primary transfer belt is decreased by an amount corresponding to the force given by the secondary transfer roller. Hereinafter, such a phenomenon that the secondary transfer roller is partially moved by the first transfer belt is referred to as "move together".

Because of the influence of interference mentioned above, if, for example, an abnormality occurs that the load of the primary transfer belt is decreased, it is difficult to accurately determine whether the abnormality is caused by only a change in the load of the primary transfer belt or the expansion of the secondary transfer roller. If an accurate determination cannot be made, an appropriate control cannot be performed when such an abnormality occurs.

SUMMARY OF THE INVENTION

It is a general object of the present invention to provide a load abnormality detection apparatus and method in which the above-mentioned problems are eliminated.

A more specific object of the present invention is to provide a load abnormality detection technique which can accurately determine a cause of a load abnormality in a structure of rotating rotational members, which are rotated by separate drive sources while being brought into contact with each other.

In order to achieve the object, there is provided according to one aspect of the present invention a load abnormality detection apparatus that detects a load abnormality in at least one of a first rotational member and a second rotational member provided in an apparatus including: the first rotational member and the second rotational member that contact each other directly or via a recording medium interposed therebetween; a first motor that drives the first rotational member and is controlled based on a first control element; and a second motor that drives the second rotational member and is controlled based on a second control element, the load abnormality detection apparatus comprising: an element acquisition part configured to acquire the first control element and the second control element; a first comparison part configured to compare the first control element with a first threshold value and also compare the first control element with a second threshold value larger than the first threshold value; a second comparison part configured to compare the second control element with a third threshold value and also compare the second control element with a fourth threshold value larger than the third threshold value; and an abnormality detection part configured to detect a load abnormality in a load applied to at least one of the first rotational member and the second rotational member based on results of comparison by the first comparison part and the second comparison part and identify a cause of the detected load abnormality.

Additionally, there is provided according to another aspect of the present invention an image forming apparatus comprising: the above-mentioned load abnormality detection apparatus; the primary transfer belt serving as the first rotational member and the secondary transfer roller serving as the second rotational member; the first motor that drives the primary transfer belt and is controlled based on the first control element; and the second motor that drives the secondary transfer belt and is controlled based on the second control element.

Further, there is provided according to a further aspect of the present invention a load abnormality detection method of detecting a load abnormality in a load applied to at least one of a first rotational member and a second rotational member provided in an apparatus, which includes: the first rotational member and the second rotational member that contact each other directly or via a recording medium interposed therebetween; a first motor that drives the first rotational member and is controlled based on a first control element; and a second motor that drives the second rotational member and is controlled based on a second control element, the load abnormality detection method comprising: acquiring the first control element and the second control element; comparing the first control element with a first threshold value and also comparing the first control element with a second threshold value larger than the first threshold value; comparing the second control element with a third threshold value and also comparing the second control element with a fourth threshold value larger than the third threshold value; and detecting a load abnormality in a load applied to at least one of the first rotational member and the second rotational member based on results of the comparisons relating to the first control element and the second control element and also identifying a cause of the detected load abnormality.

Additionally, there is provided according to yet another aspect of the present invention a computer readable recording medium storing a program to cause a computer to perform the above-mentioned load abnormality detection method.

Other objects, features and advantages of the present invention will become more apparent from the following detailed description when read in conjunction with the accompanying drawings.

BRIEF DESCRIPTION OF THE DRAWINGS

FIG. 6 is a flowchart of a load abnormality detection process according to the first embodiment;

FIGS. 13A through 13D are graphs indicating changes in a motor drive current when an abnormality occurs in a primary transfer motor and/or a secondary transfer motor;

FIGS. 15A through 15D are graphs indicating changes in a motor drive current when an abnormality occurs in a primary transfer motor and/or a secondary transfer motor in the first variation of the first embodiment.

DETAILED DESCRIPTION OF THE PREFERRED EMBODIMENTS

A description will be given below, with reference to the drawings, of embodiments of the present invention.

Figure 1:
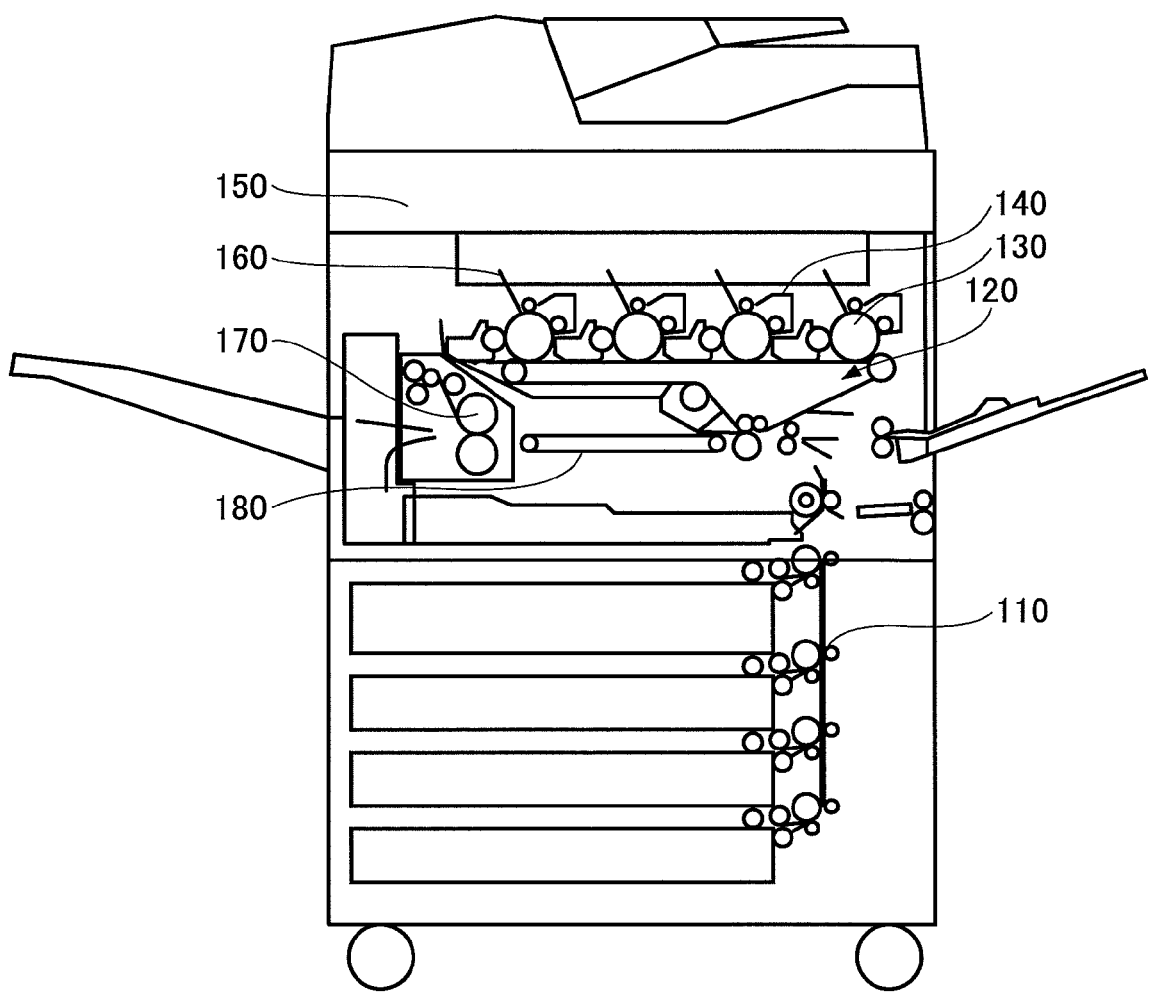
FIG. 1 is an illustration of an entire structure of an image forming apparatus according to an embodiment of the present invention.

FIG. 1 is an illustration of an outline structure of an image forming apparatus according to an embodiment of the present invention. In the image forming apparatus 100, a scanner part 150 reads an original document by irradiating a scanning light onto the original document and receiving a reflected light from the original document by a 3-line CCD sensor. Image data obtained by reading the original document is subjected to a scanner γ correction process, a color conversion process, an image separation process, a gradation correction process, etc., in an image processing unit. The processed image data is sent to an image writing unit 160. The image writing unit 160 generates a laser beam by a laser diode (LD) and modulates the laser beam according to the image data. A photoconductor unit 130 projects the laser beam onto a uniformly charged surface of a photoconductor drum to form a latent image on the uniformly charged surface. A development unit 140 develops the latent image by supplying a toner to the photoconductor drum. A toner image formed on the photoconductor drum is transferred onto a transfer belt of a primary transfer unit of a paper transfer part 120. In a case of a full-color copy, toner images of four colors (black (Bk), cyan (C), magenta (M), yellow (Y)) are formed on four conductive drums, respectively, and the four color toner images are sequentially transferred to the primary transfer belt one on another to form a full-color toner image. After the full-color toner image is formed, a transfer paper is fed from a paper supply part in synchronization with the primary transfer belt. Then, the paper transfer part 120 transfers the full-color toner image from the primary transfer belt to the transfer paper. The transfer paper having the full-color toner image thereon is conveyed to the fixing part 170 through a conveyance part 180. The fixing part 170 fixes the full-color toner image on the transfer paper by heating. Then, the transfer paper is ejected onto a paper eject tray. Although the above-mentioned color copy machine 100 is an image forming apparatus of an indirect transfer type, the present invention may be applied to an image forming apparatus of a direct transfer type.

Figure 2:
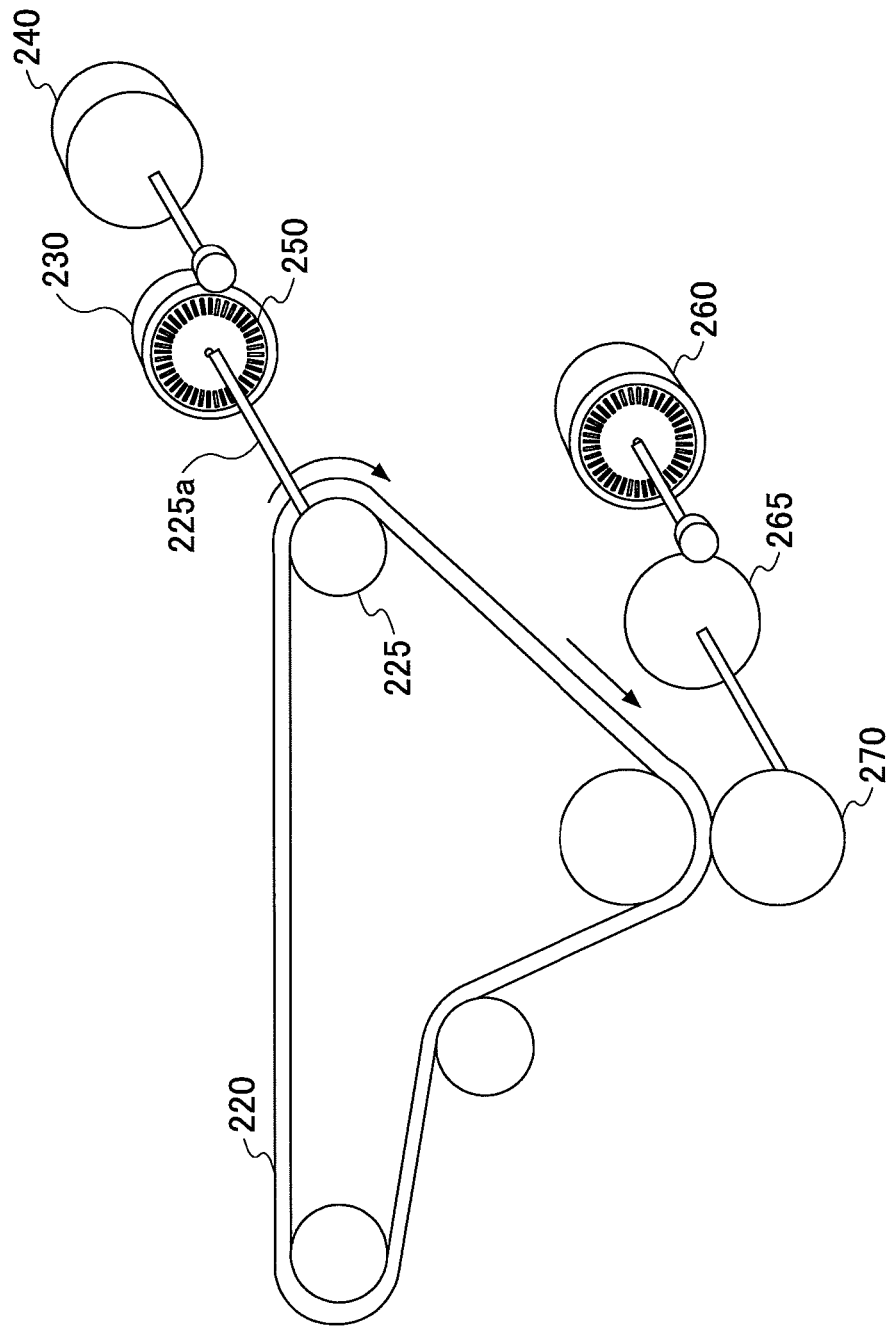
FIG. 2 is an illustration of a structure of a paper transfer part.

FIG. 2 is an illustration indicating a structure of the paper transfer part 120. A primary transfer belt 220 is driven by a primary transfer motor 240. A reduction mechanism 230 is provided between a primary transfer motor 240 and a primary transfer belt drive roller 225 so that a motor axis speed is transmitted to the primary transfer belt drive roller 225 by being reduced according to a gear reduction ratio of the reduction mechanism 230.

The secondary transfer roller 270 is driven by a secondary transfer drive motor 260. A reduction mechanism 265 is provided between a secondary transfer drive motor 260 and a secondary transfer roller 270. A control is performed based on detection values of an encoder 250 provided to the primary transfer belt drive roller axis 225a and a belt sensor (not illustrated in the figure) so that a belt surface of the primary transfer belt 220 moves at a fixed speed.

In the following description, the primary transfer belt 220 corresponds to a first rotational member, and the secondary transfer roller 270 corresponds to a second rotational member. The primary transfer motor 240 corresponds to a first motor, and the secondary transfer drive motor 260 corresponds to a second motor. Accordingly, the first rotational member and the second rotational member are brought into contact with each other.

In the following description, the load abnormality detection apparatus according to the present embodiment detects load abnormalities generated in the primary transfer belt 220 and the secondary transfer roller 270. However, a load abnormality detected by the load abnormality detection apparatus according to the present embodiment is not limited to an abnormality generated in the primary transfer belt 220 and the secondary transfer roller 270. The load abnormality detection apparatus according to the present embodiment may detect a load abnormality generated in loads applied to the first rotational member and the second rotational member that are in contact with each other.

First Embodiment

A description will be given below of a first embodiment of the present invention. In the first embodiment, a drive current (first drive current) supplied to the primary transfer motor 240 is set as a first control element (or a first parameter), and a drive current (a second drive current) supplied to the secondary transfer motor 260 is set as a second control element (or a second parameter).

Figure 3:
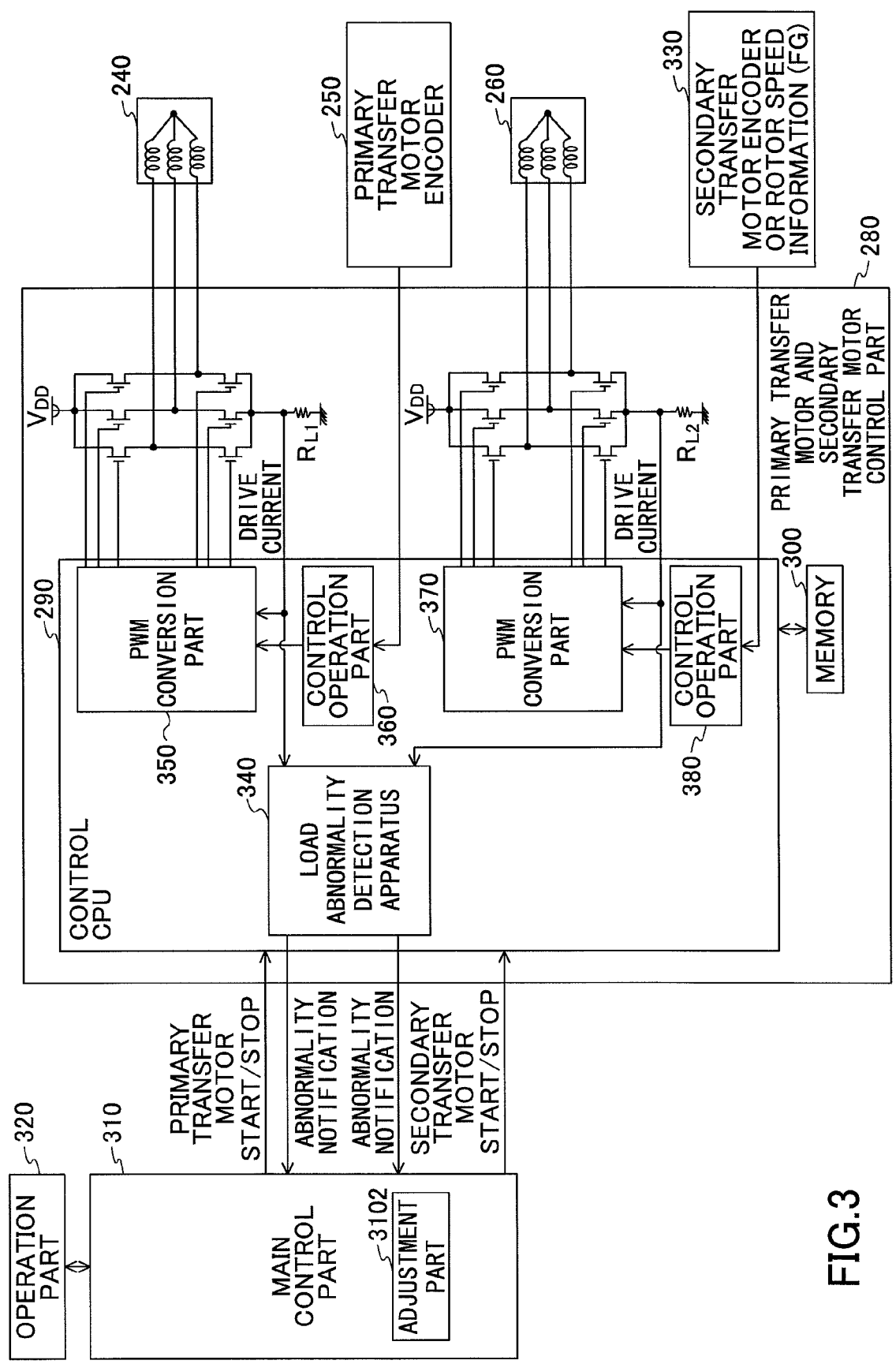
FIG. 3 is a functional block diagram of a main control part and a motor control part of a load abnormality detection apparatus according to a first embodiment of the present invention.

A description will be given first of functions of a main control part and a motor control part of the image forming apparatus according to the first embodiment. FIG. 3 is a functional block diagram of the main control part 310 and the motor control part 280.

The main control part 310 sends a start signal, a rotation direction signal, etc., to a control CPU 290 of the motor control part 280. The motor control part 280 drives the primary transfer motor 240 by supplying a drive current to the primary transfer motor 240 and drives the secondary transfer motor 260 by supplying a drive current to the secondary transfer motor 260. In the following description, the drive current supplied to the primary transfer motor 240 is referred to as a "first drive current", and a drive current supplied to the secondary transfer motor 260 is referred to as a "second drive current".

The speed of the primary transfer motor 240 is feedback controlled based on a speed signal output from the encoder 250 of the primary transfer motor 240. The speed of the secondary transfer motor 260 is feedback controlled based on a speed signal output from the encoder 330 of the secondary transfer motor 260. The first drive current and the second drive current can be measured, respectively, by providing shunt resistors $R_{L1}$ and $R_{L2}$ to drive circuit transistors (FETs), respectively. For example, a voltage between the shunt resistor $R_{L1}$ and the drive circuit transistor for driving the primary transfer motor 240 is sent to an AD input part of the control CPU 290, and the control CPU 290 can compute the first drive current using the voltage supplied through the AD input part. Similarly, a voltage between the shunt resistor $R_{L2}$ and the drive circuit transistor for driving the secondary transfer motor 260 is sent to an AD input part of the control CPU 290, and the control CPU 290 can compute the second drive current using the voltage supplied through the AD input part.

Control operation parts 360 and 380 compute and determine torque command values based on speed information supplied from the encoder 250 of the primary transfer motor 240 and the encoder 330 of the secondary transfer motor 260, respectively. The first drive current and the second drive current are input into PWM conversion parts 350 and 370, respectively. The PWM conversion parts 350 and 370 limit the pulse width modulation duty (PWM Duty) at a time of generation of an over-current (there is no direct relation with a determination according to a torque command value).

Figure 4:
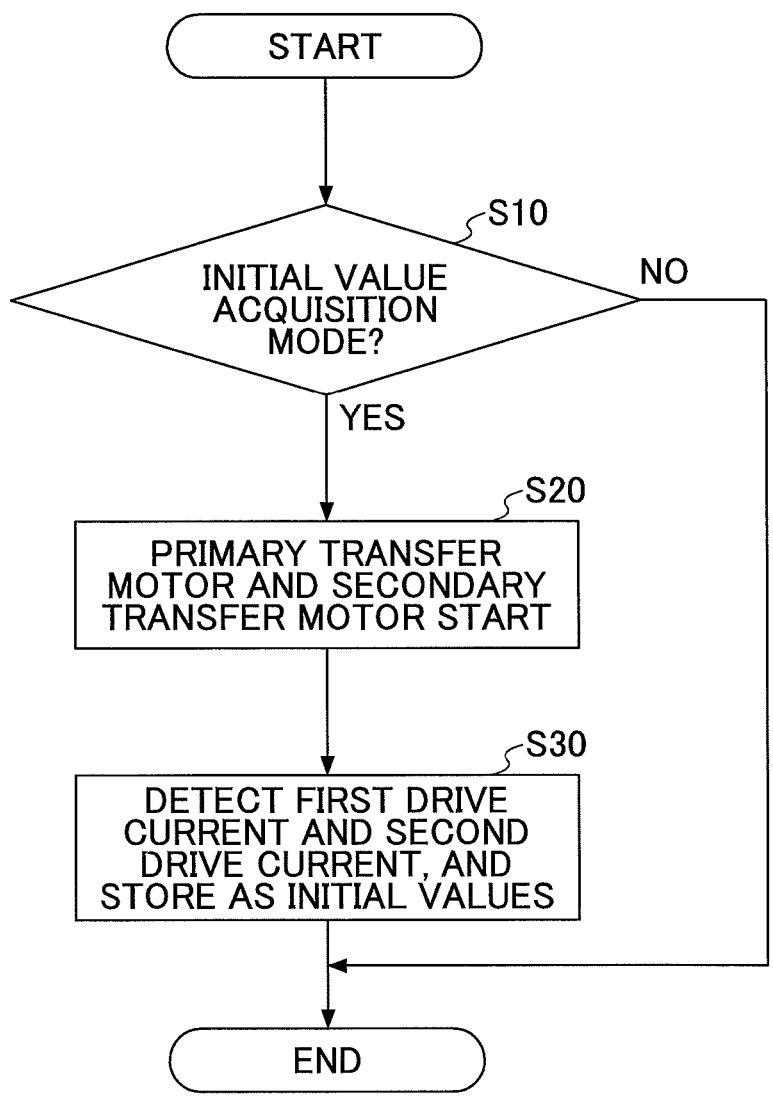
FIG. 4 is a flowchart of an initial value acquisition process according to the first embodiment.

A description is given below of a preparation process performed prior to a load abnormality detection process of the load abnormality detection apparatus according to the present embodiment. FIG. 4 is a flowchart of the preparation process. A first initial value C1 and a second initial value C2 are acquired in the preparation process illustrated in FIG. 4. The first initial value C1 is an initial value of the drive current supplied to the first transfer motor 240, and the second initial value C2 is an initial value of the drive current supplied to the second transfer motor 260. That is, the first initial value C1 is a value of the drive current supplied to the primary transfer motor 240 when there is no abnormality generated in the load applied to the primary transfer motor 240. The second initial value C2 is a value of the drive current supplied to the secondary transfer motor 260 when there is no abnormality generated in the load applied to the secondary transfer motor 260. The first initial value C1 and the second initial value C2 are used in the load abnormality detection process mentioned later.

First, it is determined in step S10 whether an initial value acquisition mode is selected in the image forming apparatus 100. Selection of the initial value acquisition mode is performed by inputting an instruction by a user performing an operation 320 (refer to FIG. 3). If it is determined that the initial value acquisition mode is not selected (NO of step S10), the preparation process is ended.

On the other hand, if it is judged that the initial value acquisition mode is selected (YES of step S10), the process proceeds to step S20. In step S20, the main control part 310 (refer to FIG. 3) starts driving the primary transfer motor 240 and the secondary transfer motor 260. Then, in step S30, the control CPU 290 acquires the value of the first drive current and the value of second drive current, and stores them in a memory 300 as an initial value C1 and an initial value C2, respectively. The initial value C1 and the initial value C2 are set as reference values of the first drive current and the second drive current, respectively.

The first initial value C1 and the second initial value C2 may be drive current values acquired at the time of design, or may be drive current values measured in a state where no load abnormality is generated at the time of factory delivery or at a time of performing maintenance work.

Figure 5:
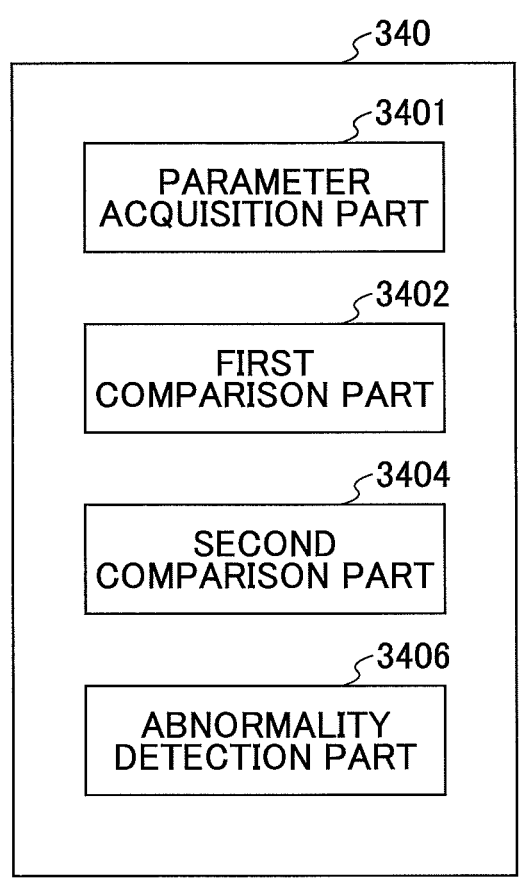
FIG. 5 is a functional block diagram of the load abnormality detection apparatus according to the first embodiment.

A description will be given below of the load abnormality detection process according to the first embodiment. FIG. 5 is a functional block diagram of the load abnormality detection apparatus 340 illustrated in FIG. 4. FIG. 6 is a flowchart of the load abnormality detection process performed by the load abnormality detection apparatus 340.

As illustrated in FIG. 5, the load abnormality detection apparatus 340 includes a parameter acquisition part 3401, a first comparison part 3402, a second comparison part 3404 and an abnormality detection part 3406.

When the load abnormality detection process illustrated in FIG. 6 is started, first, the main control part 310 starts driving the primary transfer motor 240 and the secondary transfer motor 260 (step S40). Then, the parameter acquisition part 3401 acquires the first drive current (the first control element or the first control parameter) and the second drive current (the second control element or the second control parameter) from the motor control part 280 (step S50).

Then it is judged in step S60 whether an abnormality exists in the first drive current. That is, the first comparison part 3402, which functions as first comparison means, monitors the first drive current, and judges whether the value of the first drive current is abnormal. The first comparison part 3402 judges whether the first drive current is larger than a previously set first threshold value A (refer to FIG. 7A) or smaller than a previously set second threshold value (refer to FIG. 7C). In other words, the first comparison part 3402 compares the first drive current with the first threshold value A and also compares the first drive current with the second threshold value B.

Here, the first threshold value A is a value which indicates a lower limit value for the first drive current, and the second threshold value B is a value which indicates an upper limit value for the first drive current. The first comparison part 3402 judges that the first drive current is within a normal range if the following relational expression (1) is established:

first threshold value $A$<first drive current<second threshold value $B$ (1)

On the other hand, the first comparison part 3402 judges that the first drive current is out of the normal range (that is, the first drive current is abnormal) if the following relational expression (2) is established:

first threshold value $A$>first drive current; or first drive current>second threshold value $B$ (2)

The first threshold value A and the second threshold value B are set using the first initial value C1 explained in the description of the preparation process.

For example, the first threshold value A and the second threshold value B can be set as follows:

first threshold value $A=\gamma1\cdot C1$ (a real number satisfying $0<\gamma1<1$)

second threshold value $B=\gamma2\cdot C1$ (a real number satisfying $\gamma2\geq1$)

The first threshold value A and the second threshold value B are previously stored in the memory 300.

As mentioned above, the first comparison part 3402 judges whether the first drive current is an abnormal value (step S60). If the first comparison part 3402 judges that the first drive current is a normal value, that is, if the above-mentioned relational expression (1) is established (NO of step S60), the process returns to step S50. On the other hand, if the first comparison part 3402 judges that the first drive current is an abnormal value, that is, if the above-mentioned relational expression (2) is established (YES of step S60), the process proceeds to step S70.

In step S70, the second comparison part 3404, which serves as second comparison means, checks the value of the second drive current. The check by the second comparison part 3404 is that the second comparison part 3404 compares the second drive current with a third threshold value C and also compares the second drive current with a fourth threshold value D.

The third threshold value C is a value which indicates a lower limit value for the second drive current, and the fourth threshold value D is a value which indicates an upper limit value for the second drive current. That is, if the following relational expression (3) is satisfied, the second comparison part 3404 judges that the second drive current is in a normal range:

third threshold value $C\leq$second drive current$\leq$fourth threshold value $D$ (3)

In the following description, a case where the relational expression (3) is satisfied is referred to as "the second drive current does not change (no change in second drive current)". Additionally, if the following relational expression (4) is satisfied, the second comparison part 3404 judges that "the second drive current is small":

third threshold value $C$>second drive current (4)

If the following relational expression (5) is satisfied, the second comparison part 3404 judges that "the second drive current is large":

second drive current>fourth threshold value $D$ (5)

The third threshold value C and the fourth threshold value D are set using the second initial value C2 explained in the description of the preparation process. For example, the third threshold value C and the fourth threshold value D can be set as follows:

third threshold value $C=\gamma3\cdot C2$ (a real number satisfying $0<\gamma3<1$)

fourth threshold value $D=\gamma4\cdot C2$ (a real number satisfying $\gamma4\geq1$)

The third threshold value C and the fourth threshold value D are previously stored in the memory 300.

Then, the abnormality detection part 3406, which serves as abnormality detecting means, detects a load abnormality (an abnormality generated in the load) of the primary transfer belt 220 (first rotational member) and/or the secondary transfer roller 270 (second rotational member) based on a result of comparison by the first comparison part 3402 and a result of comparison by the second comparison part 3404, and also identifies a cause of the load abnormality.

Each of FIGS. 7A through 7D is a graph indicating an example of changes in the first drive current and the second drive current when a load abnormality occurs in the primary transfer motor 240 and/or the secondary transfer motor 260. In each of FIGS. 7A through 7D, a vertical axis represents a drive current value and a horizontal axis represent a time.

(1) Process of Identifying a Cause of Generation of Load Abnormality (Part 1):

If the first comparison part 3402 judges that the first drive current is smaller than the first threshold value A (that is, the lower limit value) and the second comparison part 3404 judges that the second drive current is smaller than the third threshold value C or there is no change in the second drive current (the state illustrated in FIG. 7A), the process proceeds to step S120 of FIG. 6.

That the second drive current is smaller than the third threshold value C (relational expression (4)) or there is no change in the second drive current (relational expression (3)) indicates, in other words, that a relationship "the second drive current$\leq$fourth threshold value D" is established. Therefore, what is required for the second comparison part 3404 is to compare the second drive current with the fourth threshold value D.

Figure 7A:
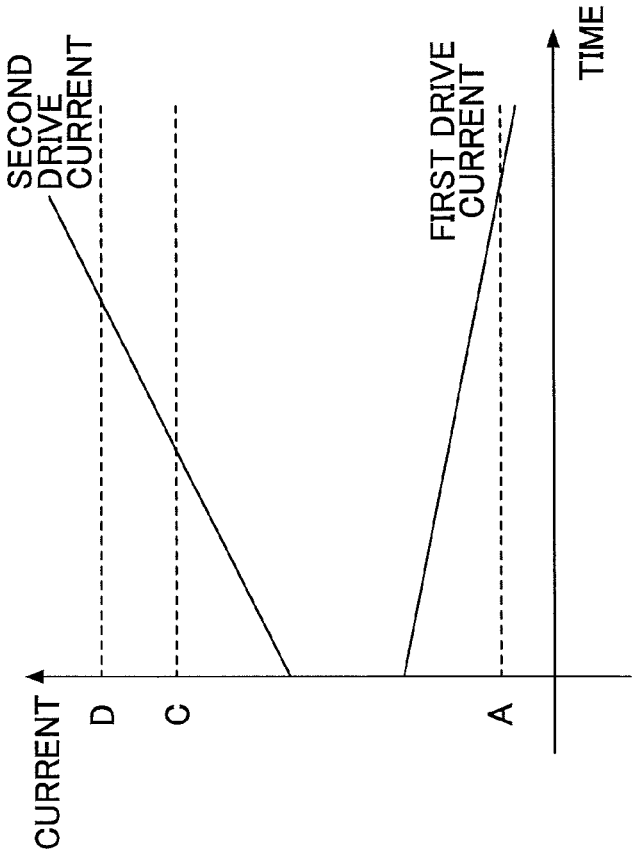
FIGS. 7A through 7D are graphs indicating changes in a motor drive current when an abnormality occurs in a primary transfer motor and/or a secondary transfer motor.

The state of FIG. 7A is under a condition where the load of the primary transfer belt 220 is extremely small due to a first peculiar cause. The first peculiar cause includes "wear of a cleaning blade contacting the primary transfer belt 220, slippage between the primary transfer belt 220 and the secondary transfer roller 270, etc".

If the load of the primary transfer belt 220 is extremely small, the first drive current flowing to the primary transfer motor 240 is extremely small, which results in the first drive current becoming smaller than the first threshold value A (lower limit value).

Moreover, there may be a case where the load of the secondary transfer roller 270 becomes small in association with an extreme reduction in the load of the primary transfer belt 220. In such a case, the second drive current becomes smaller than the third threshold value C. If the secondary transfer belt 270 does not receive an influence of the extreme reduction in the load of the primary transfer belt 220, the second drive current does not change. FIG. 7A illustrates a case where the second drive current does not change.

Then, in the state illustrated in FIG. 7A, the abnormality detection part 3406 identifies the cause of the load abnormality as the first peculiar cause (step S120). Then, the load abnormality detection apparatus 340 sends an abnormality notification signal, which indicates that "there is the first cause peculiar to the primary transfer belt 220", to the main control part 310 (step S130 of FIG. 6).

(2) Process of Identifying a Cause of Generation of Load Abnormality (Part 2):

If the first comparison part 3402 judges that the first drive current is smaller than the first threshold value A (that is, the lower limit value) and the second comparison part 3404 judges that the second drive current is larger than the fourth threshold value D (that is, the upper limit value) (FIG. 7B), the process proceeds to step S140 of FIG. 6.

Figure 7B:
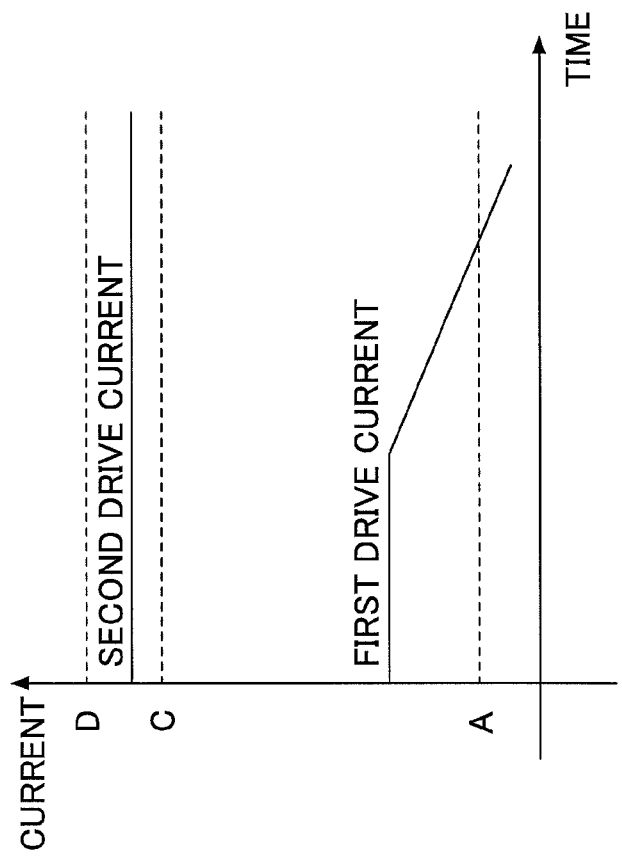

The case of FIG. 7B is under a condition where "movement together" of the primary transfer belt 220 by the second transfer roller 270 is generated. Here, the term "movement together" means that the primary transfer belt 220 is driven by a rotating force of the secondary transfer roller 270.

The phenomenon of "movement together" occurs when, for example, the roller diameter of the secondary transfer roller 270 is increased due to thermal expansion of the secondary transfer roller 270. When the secondary transfer motor 260 is controlled based on a speed detected by the encoder 330 or the like and if the roller diameter of the secondary transfer roller 270 is increased due to thermal expansion, the circumferential speed of the secondary transfer roller 270 is increased even if the secondary transfer motor 260 is rotated at a target speed. Thus, the primary transfer belt 220 is drawn by the secondary transfer roller 270 of which rotating speed is increased, which results in generation of "movement together" of the primary transfer belt 220. If such a state is set, the load of the primary transfer motor 240 is decreased due to the influence of "movement together" of the primary transfer belt 220, and, thereby, the first drive current becomes small (the first drive current becomes smaller than the first threshold value A).

On the other hand, because the force to draw the primary transfer belt 220 by the secondary transfer roller 270 is increased, the second drive current is increased (the second drive current becomes larger than the third threshold value C). Accordingly, the first drive current and the second drive current change as illustrated in FIG. 7B.

In the state illustrated in FIG. 7B, the abnormality detection part 3406 identifies that a cause of the load abnormality is "movement together" of the primary transfer belt 220 caused by the secondary transfer roller 270 (step S140).

Then, the load abnormality detection apparatus 340 sends to the main control part 310 an abnormality notification signal, which indicates that the primary transfer belt 220 is moved together with the secondary transfer roller 270 (step S150).

(3) Process of Identifying a Cause of Generation of Load Abnormality (Part 3):

If the first comparison part 3402 judges that the first drive current is larger than the second threshold value B (that is, the upper limit value) and the second comparison part 3404 judges that the second drive current is larger than the third threshold value C or there is no change in the second drive current (FIG. 7C), the process proceeds to step S100 of FIG. 6.

Here, if a condition where the second drive current is larger than the fourth threshold vale D (relational expression (5)), or there is no change in the second drive current (relational expression (3)) corresponds to a condition where the second drive current third threshold value C. Accordingly, the comparison part 3404 may merely compare the second drive current with the third threshold value C.

Figure 7C:
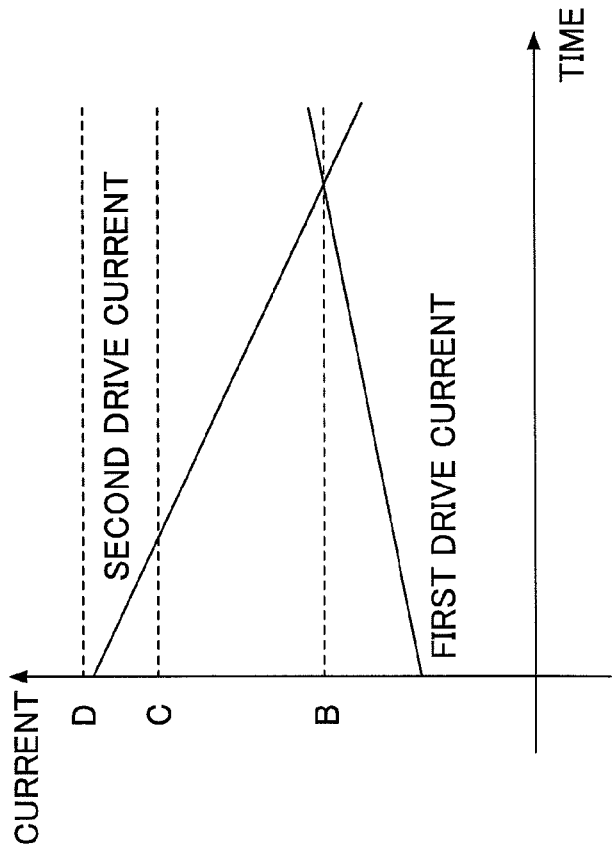

The state of FIG. 7C is the situation where a load of the primary transfer belt 220 becomes extremely large due to a second peculiar cause. The second peculiar cause includes, for example, that "a cleaning blade contacting the primary transfer belt 220 is drawn by the primary transfer belt 220 due to a shock applied from outside" and that "a pressure between the primary transfer belt 220 and the secondary transfer roller 270 is increased".

The situation of FIG. 7C is opposite to the situation of FIG. 7A mentioned above. If the load of the primary transfer belt 220 becomes extremely large, the first drive current flowing to the primary transfer motor 240 becomes extremely large (that is, the first drive current is larger than the second threshold value B (upper limit value)). Moreover, there may be a case where the load of the secondary transfer roller 270 becomes large in association with an extreme increase in the load of the primary transfer belt 220. In such a case, the second drive current becomes larger than the third threshold value C. If the secondary transfer roller 270 is not influenced by the extreme increase in the load of the primary transfer belt 220, the second drive current does not change. FIG. 7C illustrates a case where the second drive current does not change.

In the state of FIG. 7C, the abnormality detection part 3406 identifies a cause of the load abnormality as the second peculiar cause in the primary transfer belt 220 (step S100). Thus, the abnormality detection part 3406 can identify the second peculiar cause as mentioned above.

Then, the load abnormality detection apparatus 340 sends to the main control part 310 an abnormality notification signal indicating that "there is the second cause peculiar to the primary transfer belt 220" (step S110).

(4) Process of Identifying a Cause of Generation of Load Abnormality (Part 4):

If the first comparison part 3402 judges that the first drive current is larger than the second threshold value B (that is, the upper limit value) and the second comparison part 3404 judges that the second drive current is smaller than the third threshold value C (that is, the lower limit value) (FIG. 7D), the process proceeds to step S80 of FIG. 6.

The state of FIG. 7B is under a condition where "movement together" of the primary transfer belt 220 caused by the second transfer roller 270 is generated. Here, the term "movement together" means that the secondary transfer roller 270 is driven by a rotationally moving force of the first transfer belt 220.

The phenomenon of "movement together" occurs when, for example, the roller diameter of the secondary transfer roller 270 is decreased due to thermal contraction of the secondary transfer roller 270. When the secondary transfer motor 260 is controlled based on a speed detected by the encoder 330 or the like and if the roller diameter of the secondary transfer roller 270 is decreased due to thermal contraction, the circumferential speed of the secondary transfer roller 270 is decreased even if the secondary transfer motor 260 is rotated at a target speed. Thus, the secondary transfer roller 270 of which rotating speed is decreased is rotated by being drawn by the primary transfer belt 220. Under such a condition, the load of the primary transfer motor 240 is increased due to the influence of "movement together" of the secondary transfer belt 270, and, thereby, the first drive current becomes large (the first drive current becomes larger than the second threshold value B).

On the other hand, because the force to draw the secondary transfer roller 270 by the secondary transfer belt 220 is decreased, the second drive current is decreased (the second drive current becomes smaller than the third threshold value C).

Figure 7D:
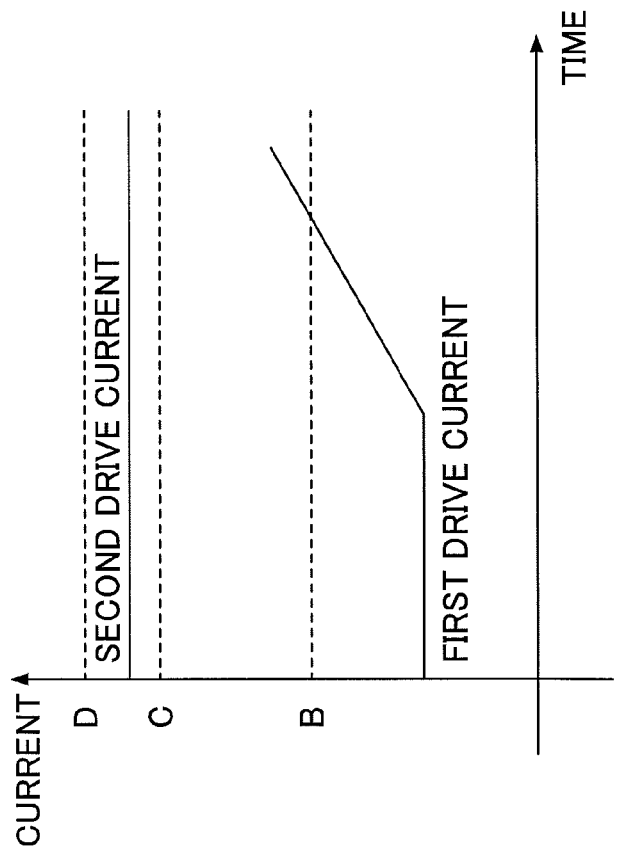

In the state illustrated in FIG. 7D, the abnormality detection part 3406 identifies that a cause of the load abnormality is "movement together" of the secondary transfer roller 270 caused by the primary transfer belt 220 (step S80). Then, the load abnormality detection apparatus 340 sends to the main control part 310 an abnormality notification signal indicating that the secondary transfer roller 270 is moved together with the primary transfer belt 220 (step S90).

As mentioned above, the notifications of the steps S90, S110, S130 and S150, which indicate identified causes, are sent from the abnormality detection part 3406 of the load abnormality detection apparatus 340 to the main control part 310. The main control part 310 may display the cause indicated by the notification on the operation part 320, or may send a notification of the cause to a maintenance service through a network line.

As mentioned above, the load abnormality detection apparatus 340 according to the present embodiment can identify properly and surely a cause of a load abnormality of the primary transfer belt 220 and the secondary transfer roller 270 by measuring the first drive current and the second drive current.

First Variation of First Embodiment

Figure 8:
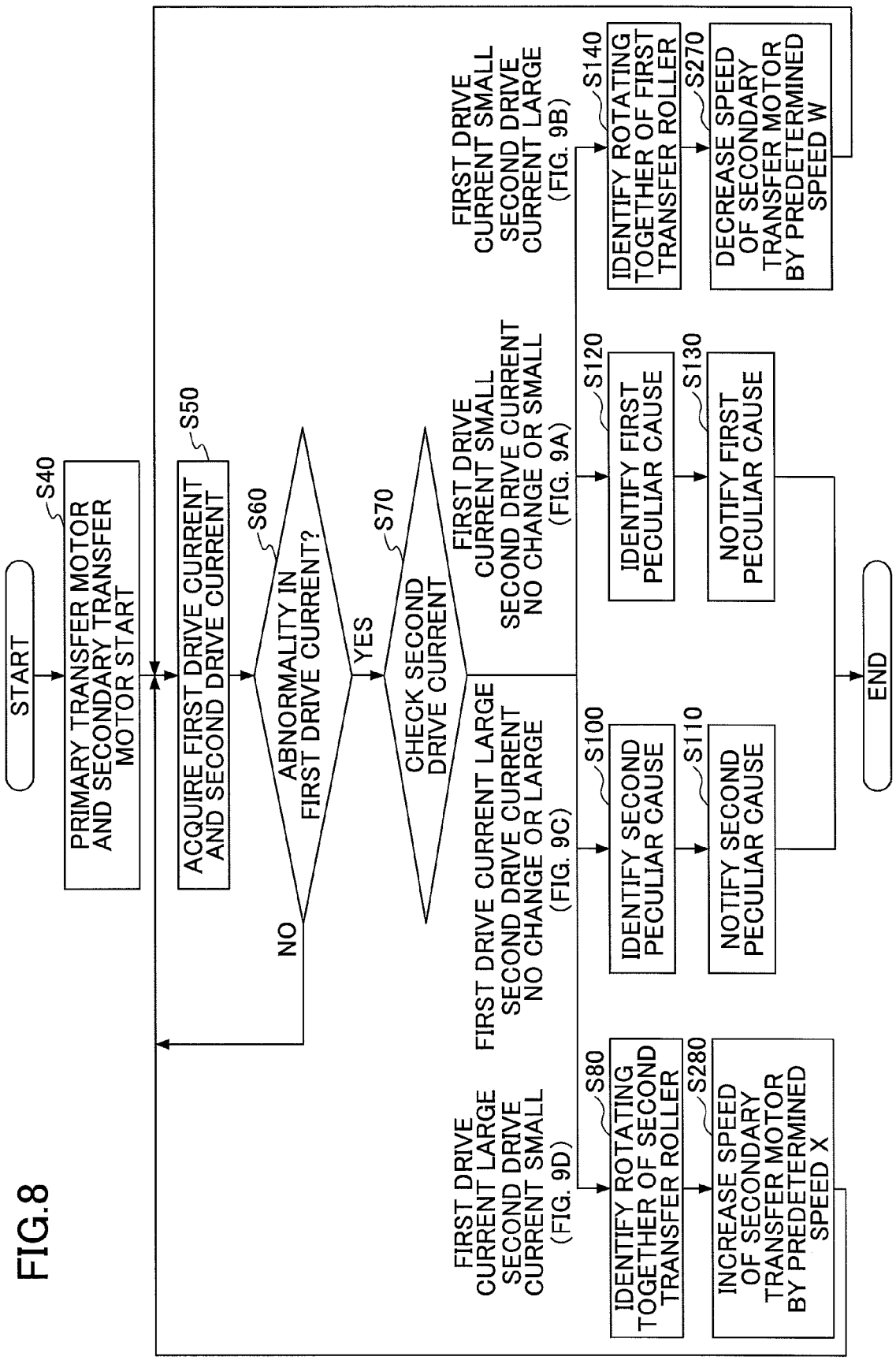
FIG. 8 is a flowchart of a load abnormality detection process according to a first variation of the first embodiment.

A description will now be given, with reference to FIG. 8, of a load abnormality detection process according to a first variation of the first embodiment. In the load abnormality detection process illustrated in FIG. 8, step S270 is substituted for step S150 of FIG. 6 and step S280 is substituted for step S90 of FIG. 6. Steps of FIG. 8 other than steps S270 and S280 are the same as the steps illustrated in FIG. 6, and descriptions thereof will be omitted. In the following description, the rotating speed of the secondary transfer roller 270 when "movement together" is not generated is referred to as a reference speed V.

A description will be given of the process of step S270. The abnormality detection part 3406 detects in step S140 that "movement together" of the primary transfer belt 220 caused by the secondary transfer roller 270 is generated. The fact that "movement together" is generated indicates that the rotating speed (circumferential speed) of the secondary transfer roller 270 is higher than the reference speed V. This is because the secondary transfer roller 270 is expanded due to a temperature rise and the circumferential speed is increased as mentioned above. Then, the adjustment part 3102 of the main control part 310 (refer to FIG. 3) adjusts the rotating speed of the secondary transfer roller (second rotational member) to the reference speed V (step S270).

Specifically, the adjustment part 3102 adjusts the circumferential speed of the secondary transfer roller 270 by decreasing the rotating speed of the secondary transfer motor 260 by a predetermined speed W. Thereby, an appropriate load is given to the primary transfer belt 220. In step S270, the rotating speed of the secondary transfer motor 260 may be decreased in a stepwise fashion until a state where an abnormality is not detected is established, or the predetermined speed W is set so that a speed adjusting operation is performed only one time.

A description is given below of the process of step S280. The abnormality detection part 3406 detects in step S80 that "movement together" of the secondary transfer roller 270 caused by the primary transfer belt 220 is generated. The fact that "movement together" is generated indicates that the rotating speed (circumferential speed) of the secondary transfer roller 270 is lower than the reference speed V. This is because the secondary transfer roller 270 is contracted due to a temperature fall and the circumferential speed is decreased as mentioned above. Then, the adjustment part 3102 of the main control part 310 adjusts the rotating speed of the secondary transfer roller (second rotational member) to the reference speed V (step S280).

Specifically, the adjustment part 3102 adjusts the circumferential speed of the secondary transfer roller 270 by increasing the rotating speed of the secondary transfer motor 260 by a predetermined speed X. Thereby, an appropriate load is given to the primary transfer belt 220. In step S280, the rotating speed of the secondary transfer motor 260 may be increased in a stepwise fashion until a state where an abnormality is not detected is established, or the predetermined speed X is set so that a speed adjusting operation is performed only one time.

According to the above-mentioned first variation, even if the rotating speed of the secondary transfer roller 270 is increased or decreased excessively, the circumferential speed of the secondary transfer roller 270 can be automatically adjusted to the reference speed V.

Second Variation of First Embodiment

A description will be given, with reference to FIG. 9, of a load abnormality detection process according to a second variation of the first embodiment. The load abnormality detection process according to the second variation is basically the same as the load abnormality detection process according to the first variation except that a fifth threshold value A' and a sixth threshold value B' are set in the second variation. The fifth threshold value A' is slightly larger than the first threshold value A, and the sixth threshold value B' is slightly smaller than the second threshold value.

By setting the fifth threshold value A' and the sixth threshold value B', the normal range of the first drive current (mentioned in relation to the relational expression (1)) is narrowed. The narrowed normal range is referred to as a second normal range. In the second variation, if the first comparison part 3402 (refer to FIG. 5) judges that the first drive current is out of the second range, the abnormality detection part 3406 identifies that there is a preindication of generation of the above-mentioned four load abnormalities.

Figure 9A:
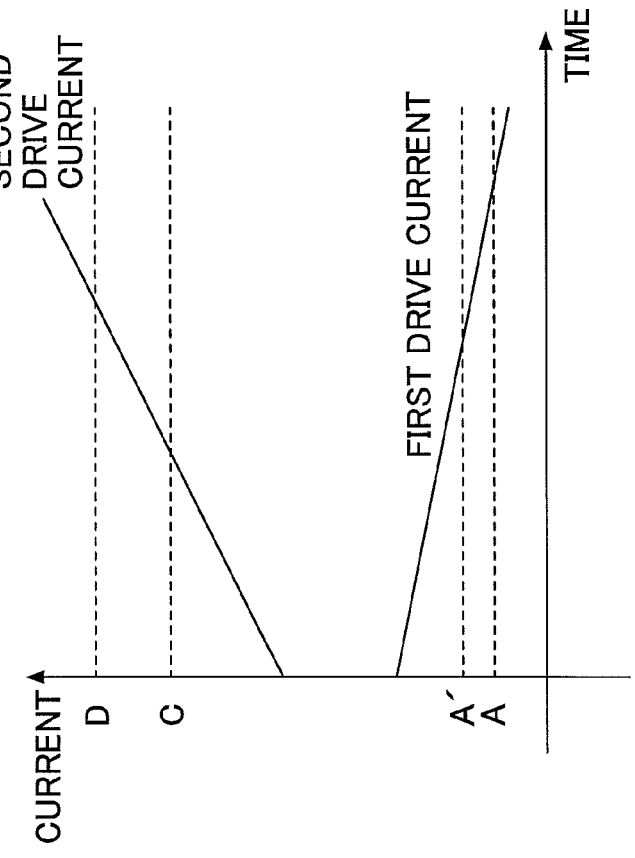
FIGS. 9A through 9D are graphs indicating changes in a motor drive current when an abnormality occurs in a primary transfer motor and/or a secondary transfer motor in the variation of the first embodiment.

FIG. 9A illustrates a case where the first comparison part 3402 judges that the first drive current is smaller than the fifth threshold value A' and the second comparison part 3404 judges that the second drive current is not larger than the third threshold value C. In this case, the load abnormality detection apparatus 340 sends to the main control part 310 an abnormality notification signal indicating that "there is a preindication of the first peculiar cause (refer to the description of FIG. 7A) peculiar to the primary transfer belt 220".

Figure 9B:
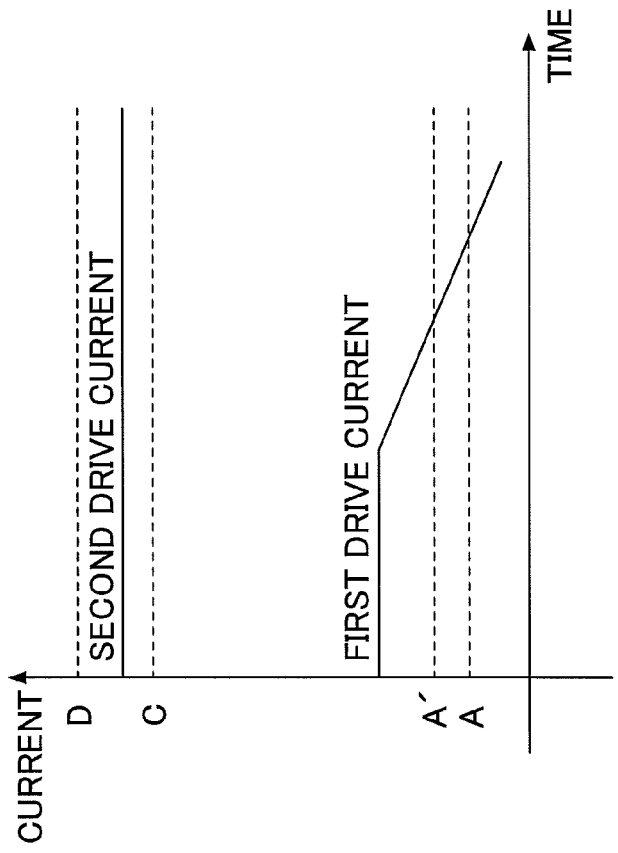

FIG. 9B illustrates a case where the first comparison part 3402 judges that the first drive current is larger than sixth threshold value B' and the second comparison part 3404 judges that the second drive current is larger than the third threshold value C. In this case, the load abnormality detection apparatus 340 sends to the main control part 310 an abnormality notification signal indicating that "there is a preindication of "movement together" of the primary transfer belt 220 caused by the secondary roller 270 (refer to the description of FIG. 7B)".

Figure 9D:
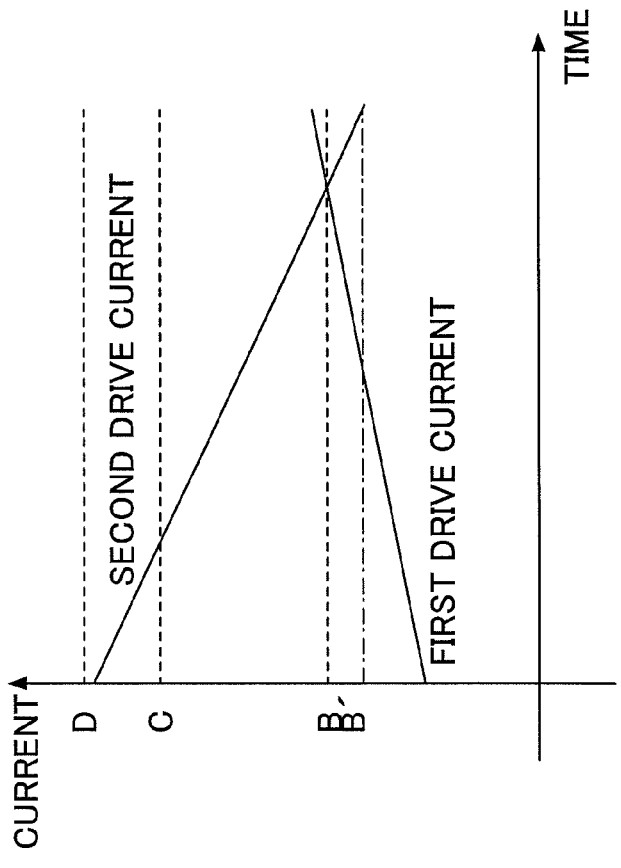
Figure 9C:
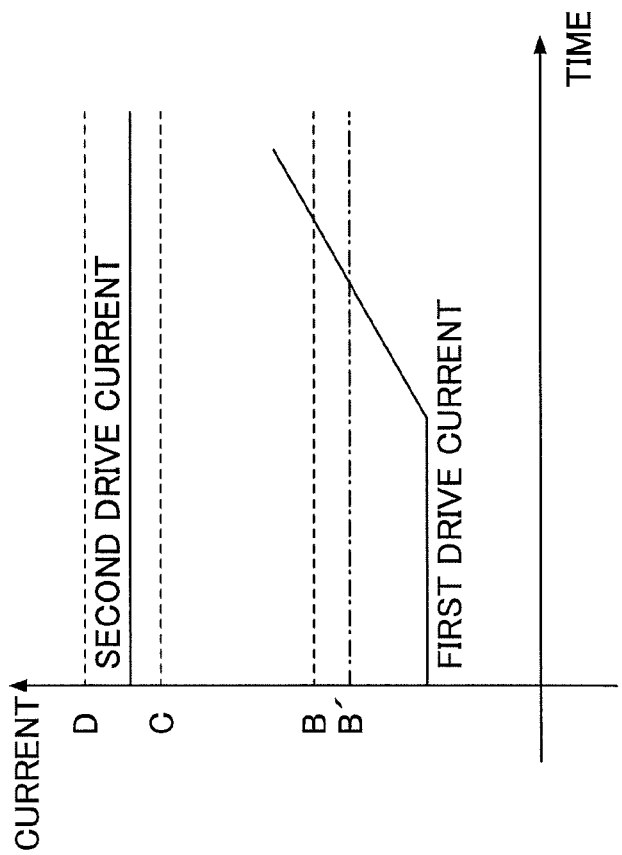

FIG. 9C illustrates a case where the first comparison part 3402 judges that the first drive current is larger than the sixth threshold value B' and the second comparison part 3404 judges that the second drive current is larger than the third threshold value C. In this case, the load abnormality detection apparatus 340 sends to the main control part 310 an abnormality notification signal indicating that "there is a preindication of the second peculiar cause (refer to the description of FIG. 7C) peculiar to the primary transfer belt 220".

FIG. 9D illustrates a case where the first comparison part 3402 judges that the first drive current is larger than sixth threshold value B' and the second comparison part 3404 judges that the second drive current is smaller than the third threshold value C. In this case, the load abnormality detection apparatus 340 sends to the main control part 310 an abnormality notification signal indicating that "there is a preindication of "movement together" of the secondary transfer roller 270 caused by the primary transfer belt 220 (refer to the description of FIG. 7D)".

According to the above-mentioned second variation, a notification of a preindication of various abnormalities can be sent to the main control part 310 of the image forming apparatus 100. Thus, measures can be taken before an abnormality is generated in an output image, which reduces a downtime of an entire system.

Second Embodiment

A description will be given of a second embodiment of the present invention. In the above-mentioned first embodiment, the first drive current is used as the first control element or the first parameter, and the second drive current is used as the second control element or the second control parameter. In the second embodiment described below, an average value of torque command values for driving the primary transfer motor 240 (hereinafter, referred to as "first torque command value") is used as the first control element or the first control parameter, and an average value of torque command values for driving the secondary transfer motor 260 (hereinafter, referred to as "second torque command value") is used as the second control element or the second control parameter. The first torque command value and the second torque command value are torque command values which the main control part 310 sends to the primary transfer motor 240 and the secondary transfer motor 260, respectively.

Figure 10:
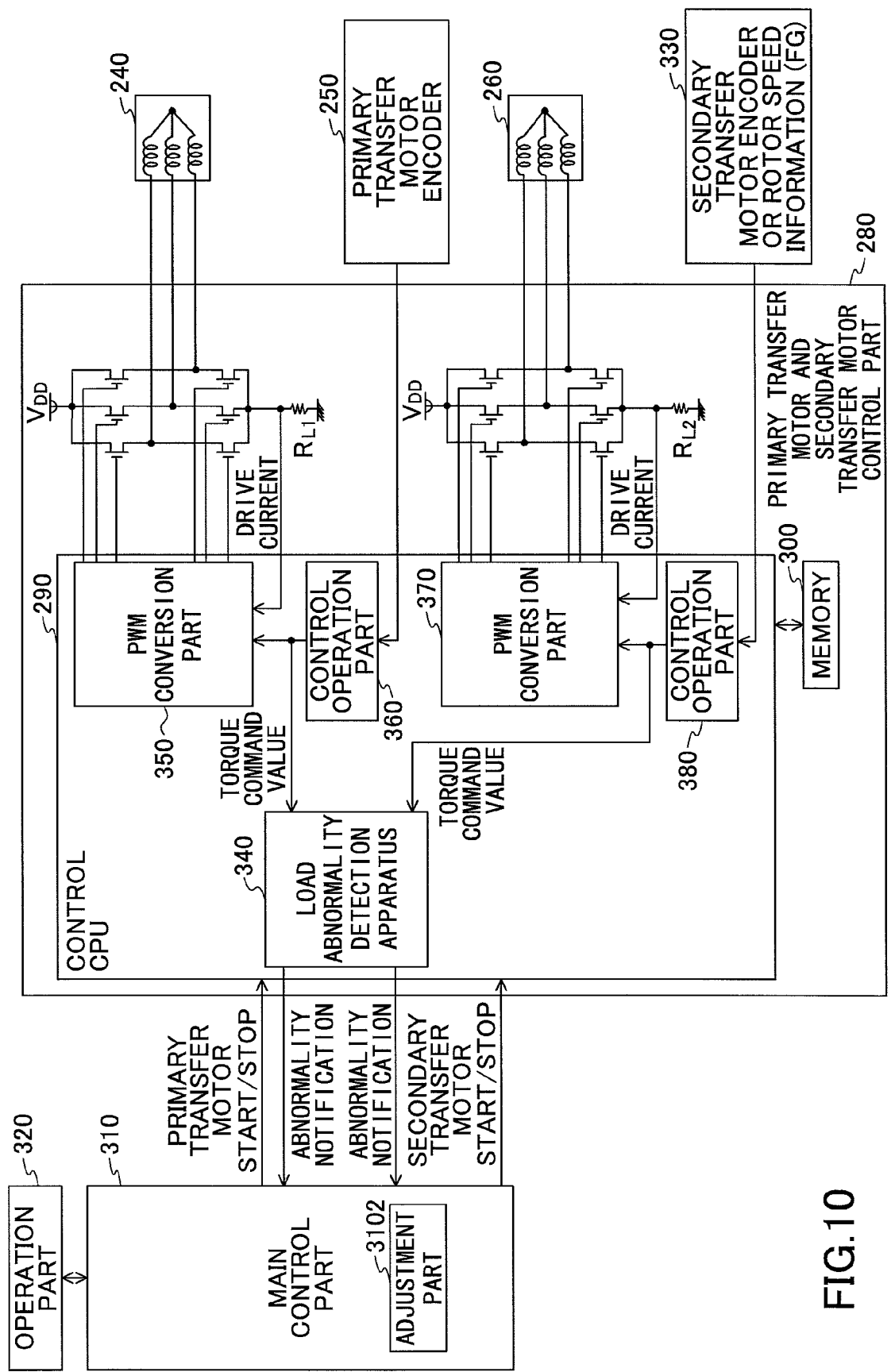
FIG. 10 is a functional block diagram of a main control part and a motor control part of a load abnormality detection apparatus according to a second embodiment of the present invention.

A description will be given first of functions of a main control part and a motor control part of the image forming apparatus according to the second embodiment. FIG. 10 is a functional block diagram of the main control part 310 and the motor control part 280. In FIG. 10, parts that are the same as the parts illustrated in FIG. 3 are given the same reference numerals.

The main control part 310 sends a start signal, a rotation direction signal, etc., to a control CPU 290 of the motor control part 280. The motor control part 280 drives the primary transfer motor 240 by supplying a drive current to the primary transfer motor 240 and drives the secondary transfer motor 260 by supplying a drive current to the secondary transfer motor 260.

The speed of the primary transfer motor 240 is feedback controlled based on a speed signal output from the encoder 250 of the primary transfer motor 240. The speed of the secondary transfer motor 260 is feedback controlled based on a speed signal output from the encoder 330 of the secondary transfer motor 260. The first drive current and the second drive current can be measured, respectively, by providing shunt resistors $R_{L1}$ and $R_{L2}$ to drive circuit transistors (FETs), respectively. For example, a voltage between the shunt resistor $R_{L1}$ and the drive circuit transistor for driving the primary transfer motor 240 is sent to an AD input part of the control CPU 290, and the control CPU 290 can compute the first drive current using the voltage supplied through the AD input part. Similarly, a voltage between the shunt resistor $R_{L2}$ and the drive circuit transistor for driving the secondary transfer motor 260 is sent to an AD input part of the control CPU 290, and the control CPU 290 can compute the second drive current using the voltage supplied through the AD input part.

Control operation parts 360 and 380 compute and determine torque command values based on speed information supplied from the encoder 250 of the primary transfer motor 240 and the encoder 330 of the secondary transfer motor 260, respectively. The first torque command value and the second torque command value are input into PWM conversion parts 350 and 370, respectively. The PWM conversion parts 350 and 370 limit the pulse width modulation duty (PWM Duty) at a time of generation of an over-current (there is no direct relation with a determination according to a torque command value).

Figure 11:
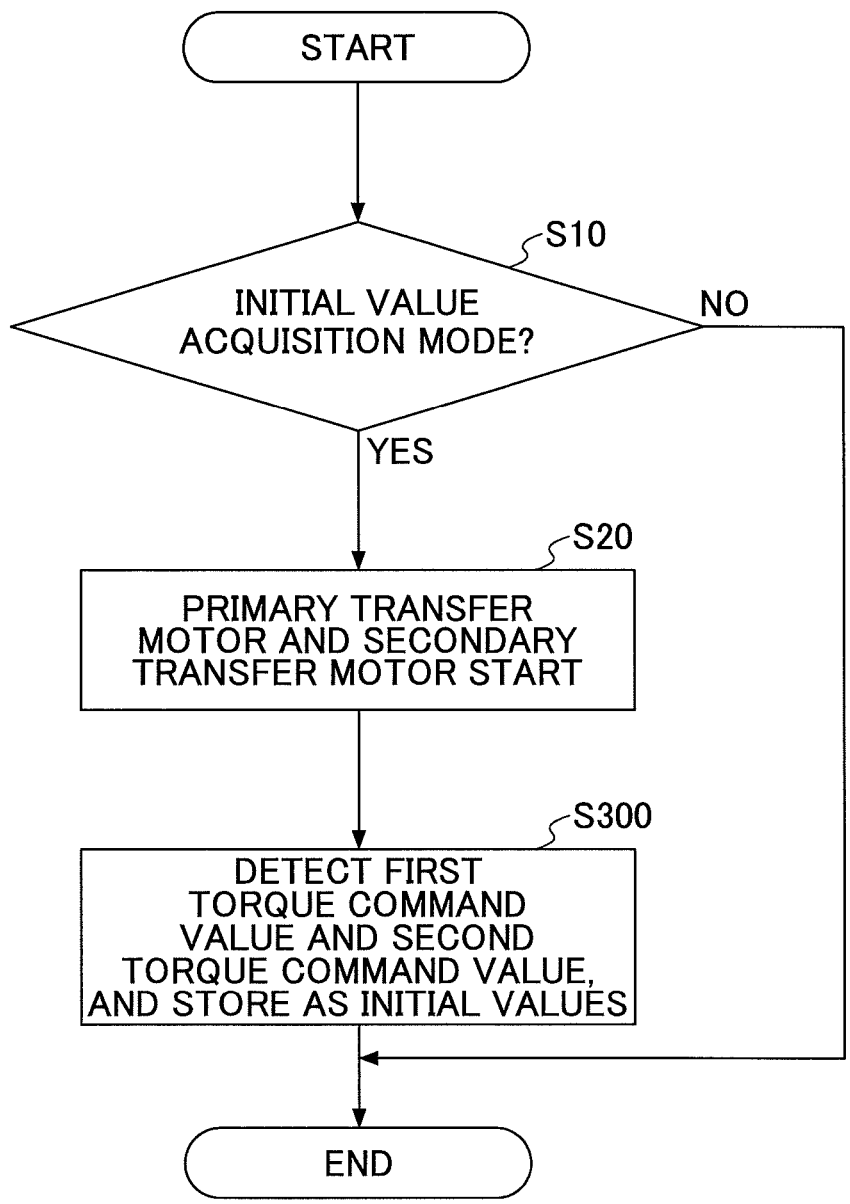
FIG. 11 is a flowchart of an initial value acquisition process according to the second embodiment.

A description is given below of a preparation process performed prior to a load abnormality detection process of the load abnormality detection apparatus according to the present embodiment. FIG. 11 is a flowchart of the preparation process according to the second embodiment.

A first initial value D1 and a second initial value D2 are acquired in the preparation process illustrated in FIG. 11. The first initial value D1 is a torque command value supplied to the first transfer motor 240, and the second initial value D2 is a torque command value supplied to the second transfer motor 260. That is, the first initial value D1 is a value of the torque command value supplied to the primary transfer motor 240 when there is no abnormality generated in the load applied to the primary transfer motor 240. The second initial value D2 is a torque command value supplied to the secondary transfer motor 260 when there is no abnormality generated in the load applied to the secondary transfer motor 260. The first initial value D1 and the second initial value D2 are used in the load abnormality detection process mentioned later.

First, it is determined in step S10 whether an initial value acquisition mode is selected in the image forming apparatus 100. Selection of the initial value acquisition mode is performed by inputting an instruction by a user operating an operation 320 (refer to FIG. 10). If it is determined that the initial value acquisition mode is not selected (NO of step S10), the preparation process is ended.

On the other hand, if it is judged that the initial value acquisition mode is selected (YES of step S10), the process proceeds to step S20. In step S20, the main control part 310 (refer to FIG. 10) starts driving the primary transfer motor 240 and the secondary transfer motor 260. Then, in step S30, the control CPU 290 acquires the value of the first torque command and the second torque command value, and stores them in a memory 300 as an initial value D1 and an initial value D2, respectively. The initial value D1 and the initial value D2 are set as reference values of the first torque command value and the second torque command value, respectively. The first initial value D1 and the second initial value D2 may be torque command values acquired at the time of design, or may be torque command values measured in a state where no load abnormality is generated at the time of factory delivery or at a time of performing a maintenance work.

Figure 12:
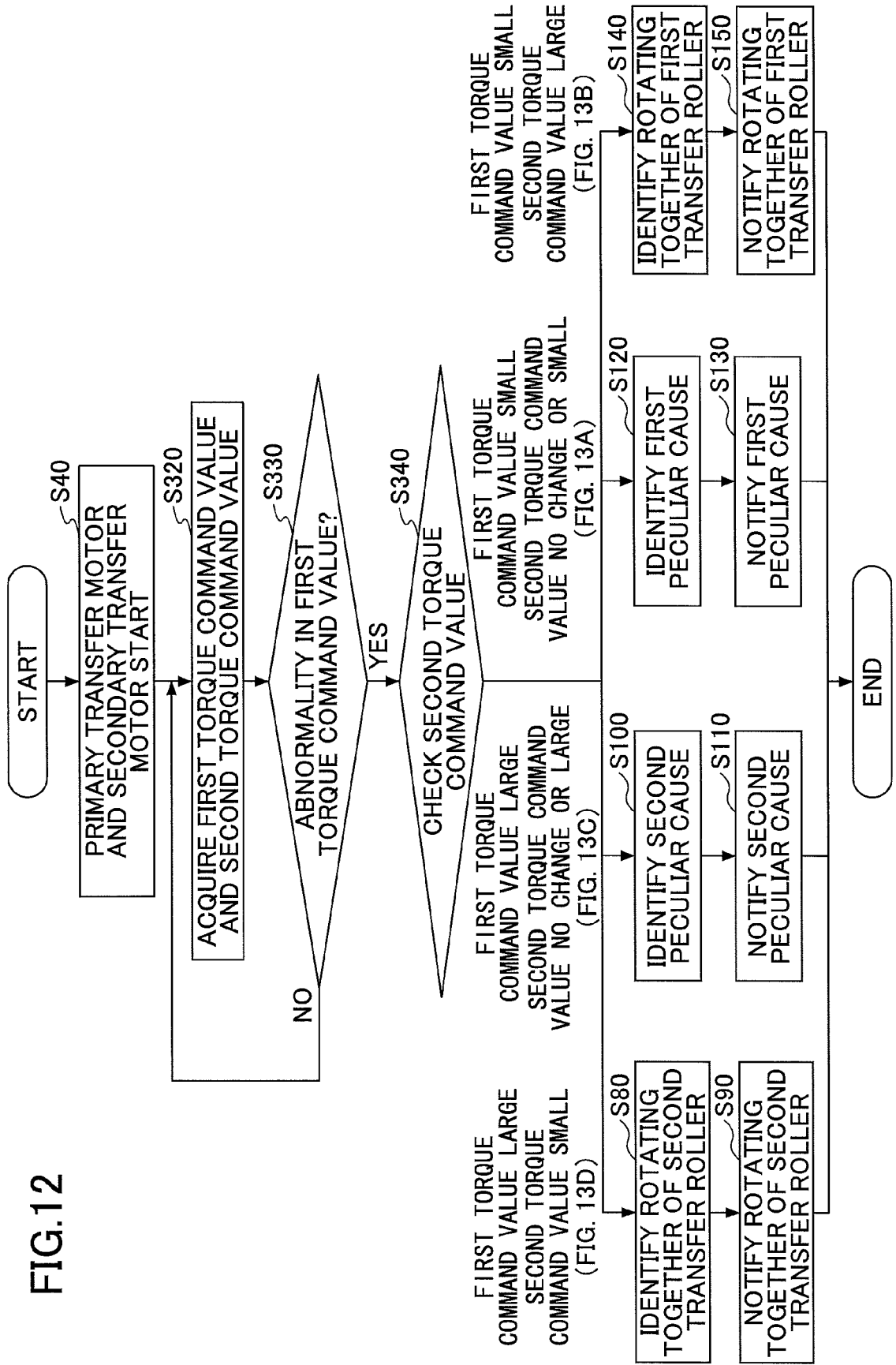
FIG. 12 is a flowchart of a load abnormality detection process according to the second embodiment.

A description will be given below of the load abnormality detection process according to the second embodiment. FIG. 12 is a flowchart of the load abnormality detection process performed by the load abnormality detection apparatus 340 according to the second embodiment.

When the load abnormality detection process illustrated in FIG. 12 is started, first, the main control part 310 starts driving the primary transfer motor 240 and the secondary transfer motor 260 (step S40). Then, the parameter acquisition part 3401 acquires the first torque command value (the first control element or the first control parameter) and the second torque command value (the second control element or the second control parameter) from the control operation parts 360 and 380 (step S320).

Then it is judged in step S330 whether an abnormality exists in the first torque command value. That is, the first comparison part 3402, which functions as first comparison means, monitors the first torque command value, and judges whether the torque command value is abnormal. The first comparison part 3402 judges whether the first torque command value is larger than a previously set first threshold value A (refer to FIG. 13A) or smaller than a previously set second threshold value (refer to FIG. 13C). In other words, the first comparison part 3402 compares the first torque command value with the first threshold value A and also compares the first torque command value with the second threshold value B.

Here, the first threshold value A is a value which indicates a lower limit value for the first torque command value, and the second threshold value B is a value which indicates an upper limit value for the first torque command value. The first comparison part 3402 judges that the first torque command value is within a normal range if the following relational expression (11) is established:

first threshold value $A$<first torque command value<second threshold value $B$ (11)

On the other hand, the first comparison part 3402 judges that the first torque command value is out of the normal range (that is, the first torque command value is abnormal) if the following relational expression (12) is established:

first threshold value $A$>first torque command value; or first torque command value>second threshold value $B$ (12)

The first threshold value A and the second threshold value B are set using the first initial value D1 explained in the description of the preparation process. For example, the first threshold value A and the second threshold value B can be set as follows:

first threshold value $A=\gamma 1 \cdot D1$ (a real number satisfying $0<\gamma 1<1$)

second threshold value $B=\gamma 2 \cdot D1$ (a real number satisfying $\gamma 2 \geq 1$)

The first threshold value A and the second threshold value B are previously stored in the memory 300.

As mentioned above, the first comparison part 3402 judges whether the first torque command value is an abnormal value (step S330). If the first comparison part 3402 judges that the first torque command value is a normal value, that is, if the above-mentioned relational expression (11) is established (NO of step S330), the process returns to step S60. On the other hand, if the first comparison part 3402 judges that the first torque command value is an abnormal value, that is, if the above-mentioned relational expression (12) is established (YES of step S330), the process proceeds to step S340.

In step S340, the second comparison part 3404, which serves as second comparison means, checks the second torque command value. The check by the second comparison part 3404 is that the second comparison part 3404 compares the second torque command value with a third threshold value C and also compares the second torque command value with a fourth threshold value D.

The third threshold value C is a value which indicates a lower limit value for the second torque command value, and the fourth threshold value D is a value which indicates an upper limit value for the second torque command value. That is, if the following relational expression (13) is satisfied, the second comparison part 3404 judges that the second torque command value is in a normal range:

third threshold value $C$≤second torque command value≤fourth threshold value $D$ (13)

In the following description, a case where the relational expression (13) is satisfied is referred to as "the second torque command value does not change (no change in second torque command value)". Additionally, if the following relational expression (14) is satisfied, the second comparison part 3404 judges that "the second torque command value is small":

third threshold value $C$>second torque command value (14)

If the following relational expression (15) is satisfied, the second comparison part 3404 judges that "the second torque command value is large":

second torque command value>fourth threshold value $D$ (15)

The third threshold value C and the fourth threshold value D are set using the second initial value D2 explained in the description of the preparation process. For example, the third threshold value C and the fourth threshold value D can be set as follows:

third threshold value $C=\gamma 3 \cdot D2$ (a real number satisfying $0<\gamma 3<1$)

fourth threshold value $D=\gamma 4 \cdot D2$ (a real number satisfying $\gamma 4 \geq 1$)

The third threshold value C and the fourth threshold value D are previously stored in the memory 300.

Then, the abnormality detection part 3406, which serves as abnormality detecting means, detects a load abnormality (an abnormality generated in the load) of the primary transfer belt 220 (first rotational member) and/or the secondary transfer roller 270 (second rotational member) based on a result of comparison by the first comparison part 3402 and a result of comparison by the second comparison part 3404, and also identifies a cause of the load abnormality.

Each of FIGS. 13A through 13D is a graph indicating an example of changes in the first torque command value and the second torque command value when a load abnormality occurs in the primary transfer motor 240 and/or the secondary transfer motor 260. In each of FIGS. 13A through 13D, a vertical axis represents a torque command value and a horizontal axis represent a time.

(1) Process of Identifying a Cause of Generation of Load Abnormality (Part 1):

If the first comparison part 3402 judges that the first torque command value is smaller than the first threshold value A (that is, the lower limit value) and the second comparison part 3404 judges that the second torque command value is smaller than the third threshold value C or there is no change in the second torque command value (the state illustrated in FIG. 13A), the process proceeds to step S120 of FIG. 12.

That the second torque command value is smaller than the third threshold value C (relational expression (14)) or there is no change in the second torque command value (relational expression (13)) indicates, in other words, that a relationship "the second torque command value≤fourth threshold value D" is established. Therefore, what is required for the second comparison part 3404 is to compare the second torque command value with the fourth threshold value D.

Figure 13A:
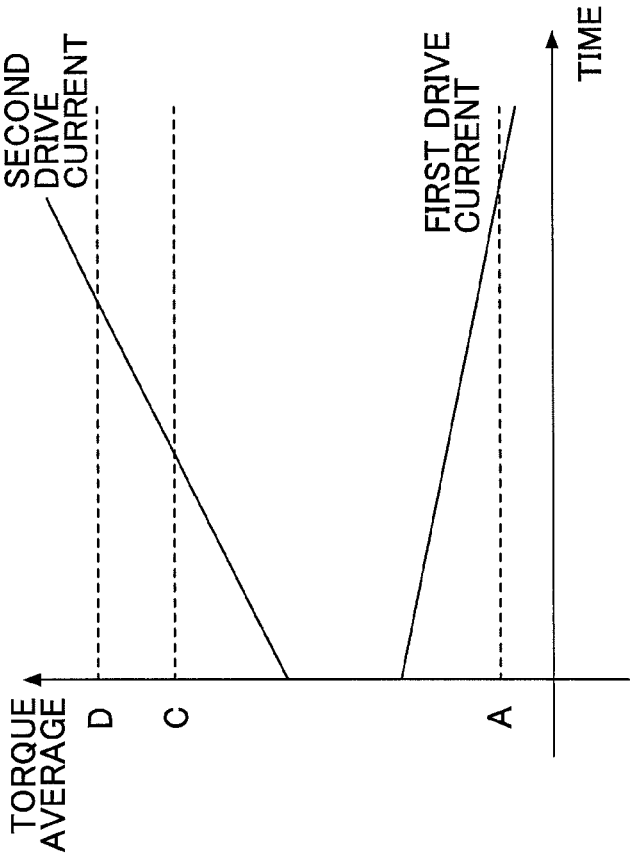

The state of FIG. 13A is under a condition where the load of the primary transfer belt 220 is extremely small due to a first peculiar cause. The first peculiar cause includes "wear of a cleaning blade contacting the primary transfer belt 220, slippage between the primary transfer belt 220 and the secondary transfer roller 270, etc".

If the load of the primary transfer belt 220 is extremely small, the first torque command supplied to the primary transfer motor 240 is extremely small, which results in the first torque command value becoming smaller than the first threshold value A (lower limit value).

Moreover, there may be a case where the load of the secondary transfer roller 270 becomes small in association with an extreme reduction in the load of the primary transfer belt 220. In such a case, the second torque command value becomes smaller than the third threshold value C. If the secondary transfer belt 270 does not receive an influence of the extreme reduction in the load of the primary transfer belt 220, the second torque command value does not change. FIG. 13A illustrates a case where the second torque command value does not change.

Then, in the state illustrated in FIG. 13A, the abnormality detection part 3406 identifies the cause of the load abnormality as the first peculiar cause (step S120). Then, the load abnormality detection apparatus 340 sends an abnormality notification signal, which indicates that "there is the first cause peculiar to the primary transfer belt 220", to the main control part 310 (step S130 of FIG. 12).

(2) Process of Identifying a Cause of Generation of Load Abnormality (Part 2):

If the first comparison part 3402 judges that the first torque command value is smaller than the first threshold value A (that is, the lower limit value) and the second comparison part 3404 judges that the second torque command value is larger than the fourth threshold value D (that is, the upper limit value) (FIG. 13B), the process proceeds to step S140 of FIG. 12.

Figure 13B:
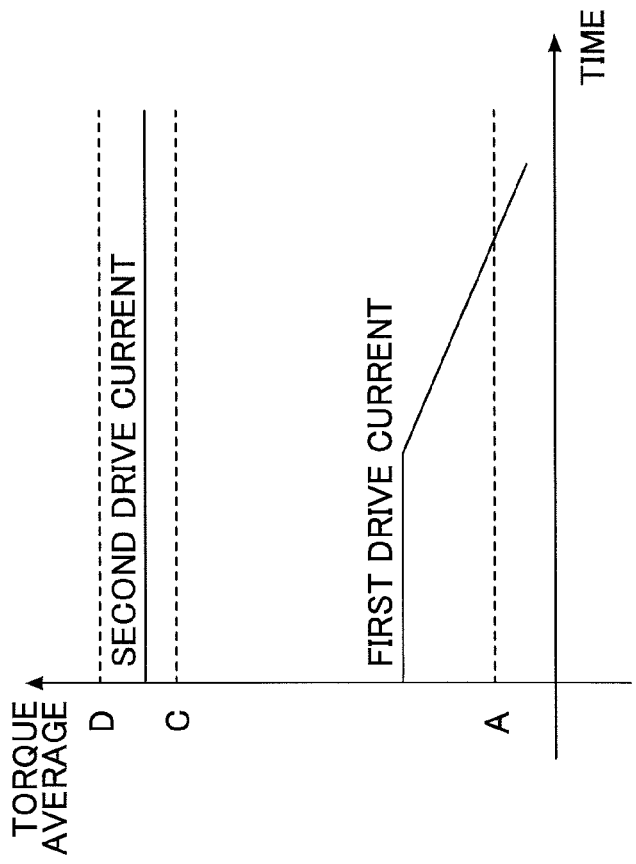

The case of FIG. 13B is under a condition where "movement together" of the primary transfer belt 220 by the second transfer roller 270 is generated. Here, the term "movement together" means that the primary transfer belt 220 is driven by a rotating force of the secondary transfer roller 270.

The phenomenon of "movement together" occurs when, for example, the roller diameter of the secondary transfer roller 270 is increased due to thermal expansion of the secondary transfer roller 270. When the secondary transfer motor 260 is controlled based on a speed detected by the encoder 330 or the like and if the roller diameter of the secondary transfer roller 270 is increased due to thermal expansion, the circumferential speed of the secondary transfer roller 270 is increased even if the secondary transfer motor 260 is rotated at a target speed. Thus, the primary transfer belt 220 is drawn by the secondary transfer roller 270 of which rotating speed is increased, which results in generation of "movement together" of the primary transfer belt 220. If such a state is set, the load of the primary transfer motor 240 is decreased due to the influence of "movement together" of the primary transfer belt 220, and, thereby, the first torque command value becomes small (the first torque command value becomes smaller than the first threshold value A).

On the other hand, because the force to draw the primary transfer belt 220 by the secondary transfer roller 270 is increased, the second torque command value is increased (the second torque command value becomes larger than the third threshold value C). Accordingly, the first torque command value and the second torque command value change as illustrated in FIG. 13B.

In the state illustrated in FIG. 13B, the abnormality detection part 3406 identifies that a cause of the load abnormality is "movement together" of the primary transfer belt 220 caused by the secondary transfer roller 270 (step S140).

Then, the load abnormality detection apparatus 340 sends to the main control part 310 an abnormality notification signal, which indicates that the primary transfer belt 220 is moved together with the secondary transfer roller 270 (step S150).

(3) Process of Identifying a Cause of Generation of Load Abnormality (Part 3):

If the first comparison part 3402 judges that the first torque command value is larger than the second threshold value B (that is, the upper limit value) and the second comparison part 3404 judges that the second torque command value is larger than the third threshold value C or there is no change in the second torque command value (FIG. 13C), the process proceeds to step S100 of FIG. 12.

Here, if a condition where the second torque command value is larger than the fourth threshold value D (relational expression (15)), or there is no change in the second torque command value (relational expression (13)) corresponds to a condition where the second torque command value≥third threshold value C. Accordingly, the comparison part 3404 may merely compare the second torque command value with the third threshold value C.

The state of FIG. 13C is the situation where a load of the primary transfer belt 220 becomes extremely large due to a second peculiar cause. The second peculiar cause includes, for example, that "a cleaning blade contacting the primary transfer belt 220 is drawn by the primary transfer belt 220 due to a shock applied from outside" and that "a pressure between the primary transfer belt 220 and the secondary transfer roller 270 is increased".

The situation of FIG. 13C is opposite to the situation of FIG. 7A mentioned above. If the load of the primary transfer belt 220 becomes extremely large, the first torque command value supplied to the primary transfer motor 240 becomes extremely large (that is, the first torque command value is larger than the second threshold value B (upper limit value)). Moreover, there may be a case where the load of the secondary transfer roller 270 becomes large in association with an extreme increase in the load of the primary transfer belt 220. In such a case, the second torque command value becomes larger than the third threshold value C. If the secondary transfer roller 270 is not influenced by the extreme increase in the load of the primary transfer belt 220, the second torque command value does not change. FIG. 13C illustrates a case where the second torque command value does not change.

In the state of FIG. 13C, the abnormality detection part 3406 identifies a cause of the load abnormality as the second peculiar cause in the primary transfer belt 220 (step S100). Thus, the abnormality detection part 3406 can identify the second peculiar cause as mentioned above.

Then, the load abnormality detection apparatus 340 sends to the main control part 310 an abnormality notification signal indicating that "there is the second cause peculiar to the primary transfer belt 220" (step S110).

(4) Process of Identifying a Cause of Generation of Load Abnormality (Part 4):

If the first comparison part 3402 judges that the first torque command value is larger than the second threshold value B (that is, the upper limit value) and the second comparison part 3404 judges that the second torque command value is smaller than the third threshold value C (that is, the lower limit value) (FIG. 13D), the process proceeds to step S80 of FIG. 12.

The state of FIG. 13B is under a condition where "movement together" of the primary transfer belt 220 caused by the second transfer roller 270 is generated. Here, the term "movement together" means that the secondary transfer roller 270 is driven by a rotationally moving force of the first transfer belt 220.

The phenomenon of "movement together" occurs when, for example, the roller diameter of the secondary transfer roller 270 is decreased due to thermal contraction of the secondary transfer roller 270. When the secondary transfer motor 260 is controlled based on a speed detected by the encoder 330 or the like and if the roller diameter of the secondary transfer roller 270 is decreased due to thermal contraction, the circumferential speed of the secondary transfer roller 270 is decreased even if the secondary transfer motor 260 is rotated at a target speed. Thus, the secondary transfer roller 270 of which rotating speed is decreased is rotated by being drawn by the primary transfer belt 220. Under such a condition, the load of the primary transfer motor 240 is increased due to the influence of "movement together" of the secondary transfer belt 270, and, thereby, the first torque command value becomes large (the first torque command value becomes larger than the second threshold value B).

On the other hand, because the force to draw the secondary transfer roller 270 by the secondary transfer belt 220 is decreased, the second torque command value is decreased (the second torque command value becomes smaller than the third threshold value C).

In the state illustrated in FIG. 13D, the abnormality detection part 3406 identifies that a cause of the load abnormality is "movement together" of the secondary transfer roller 270 caused by the primary transfer belt 220 (step S80). Then, the load abnormality detection apparatus 340 sends to the main control part 310 an abnormality notification signal indicating that the secondary transfer roller 270 is moved together with the primary transfer belt 220 (step S90).

As mentioned above, the notifications of the steps S90, S110, S130 and S150, which indicate identified causes, are sent from the abnormality detection part 3406 of the load abnormality detection apparatus 340 to the main control part 310. The main control part 310 may display the cause indicated by the notification on the operation part 320, or may send a notification of the cause to a maintenance service through a network line.

As mentioned above, the load abnormality detection apparatus 340 according to the present embodiment can identify properly and surely a cause of a load abnormality of the primary transfer belt 220 and the secondary transfer roller 270 based on the first torque command value and the second torque command value.

First Variation of Second Embodiment

Figure 14:
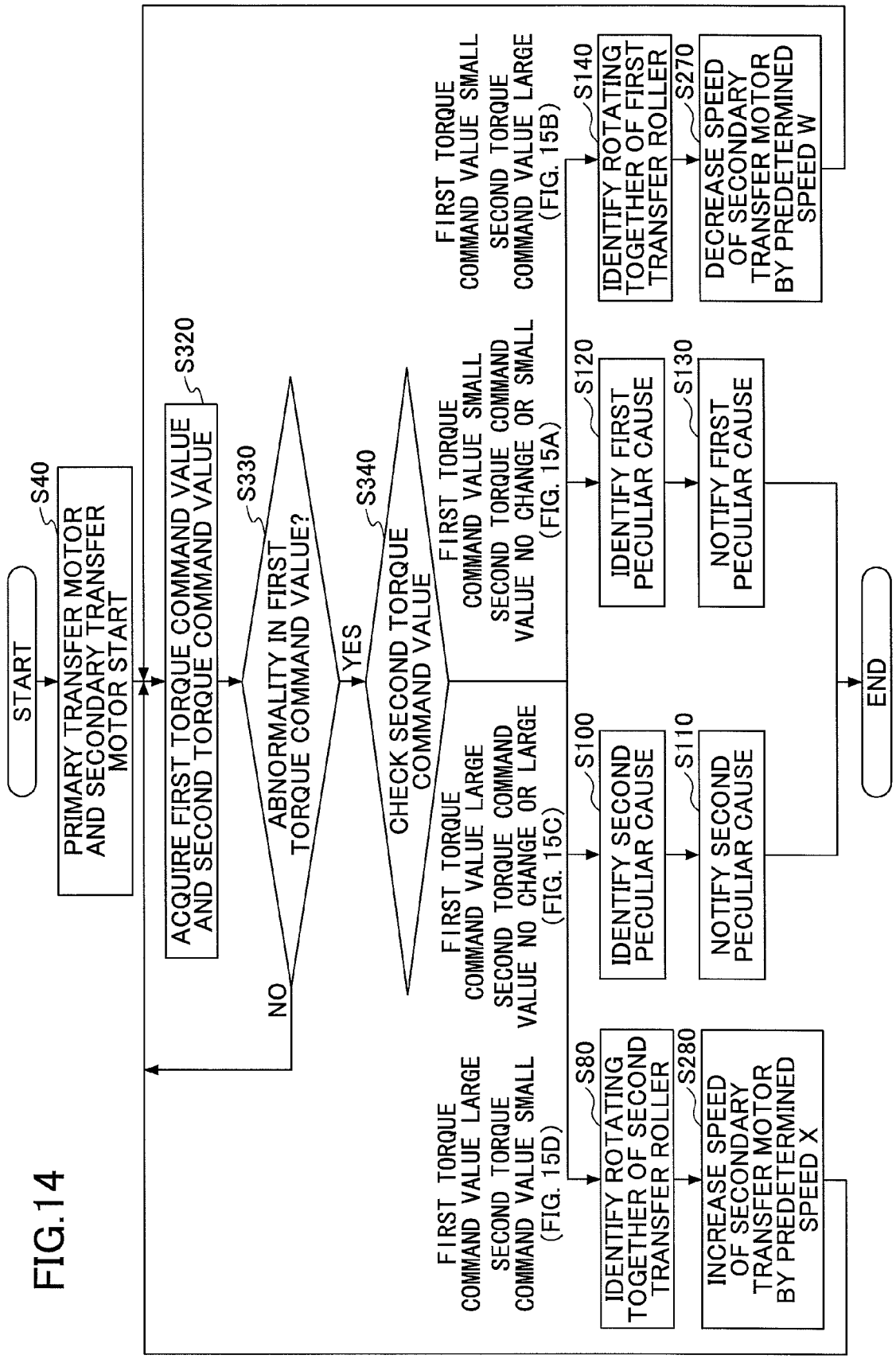
FIG. 14 is a flowchart of a load abnormality detection process according to a first variation of the second embodiment.

A description will now be given, with reference to FIG. 14, of a load abnormality detection process according to a first variation of the second embodiment. In the load abnormality detection process illustrated in FIG. 14, step S270 is substituted for step S150 of FIG. 6 and step S280 is substituted for step S90 of FIG. 12. Steps of FIG. 18 other than steps S270 and S280 are the same as the steps illustrated in FIG. 12, and descriptions thereof will be omitted. In the following description, the rotating speed of the secondary transfer roller 270 when "movement together" is not generated is referred to as a reference speed V.

A description will be given of the process of step S270. The abnormality detection part 3406 detects in step S140 that "movement together" of the primary transfer belt 220 caused by the secondary transfer roller 270 is generated. The fact that "movement together" is generated indicates that the rotating speed (circumferential speed) of the secondary transfer roller 270 is higher than the reference speed V. This is because the secondary transfer roller 270 is expanded due to a temperature rise and the circumferential speed is increased as mentioned above. Then, the adjustment part 3102 of the main control part 310 (refer to FIG. 10) adjusts the rotating speed of the secondary transfer roller (second rotational member) to the reference speed V (step S270).

Specifically, the adjustment part 3102 adjusts the circumferential speed of the secondary transfer roller 270 by decreasing the rotating speed of the secondary transfer motor 260 by a predetermined speed W. Thereby, an appropriate load is given to the primary transfer belt 220. In step S270, the rotating speed of the secondary transfer motor 260 may be decreased in a stepwise fashion until a state where an abnormality is not detected is established, or the predetermined speed W is set so that a speed adjusting operation is performed only one time.

A description is given below of the process of step S280. The abnormality detection part 3406 detects in step S80 that "movement together" of the secondary transfer roller 270 caused by the primary transfer belt 220 is generated. The fact that "movement together" is generated indicates that the rotating speed (circumferential speed) of the secondary transfer roller 270 is lower than the reference speed V. This is because the secondary transfer roller 270 is contracted due to a temperature fall and the circumferential speed is decreased as mentioned above. Then, the adjustment part 3102 of the main control part 310 adjusts the rotating speed of the secondary transfer roller (second rotational member) to the reference speed V (step S280).

Specifically, the adjustment part 3102 adjusts the circumferential speed of the secondary transfer roller 270 by increasing the rotating speed of the secondary transfer motor 260 by a predetermined speed X. Thereby, an appropriate load is given to the primary transfer belt 220. In step S280, the rotating speed of the secondary transfer motor 260 may be increased in a stepwise fashion until a state where an abnormality is not detected is established, or the predetermined speed X is set so that a speed adjusting operation is performed only one time.

According to the above-mentioned first variation, even if the rotating speed of the secondary transfer roller 270 is increased or decreased excessively, the circumferential speed of the secondary transfer roller 270 can be automatically adjusted to the reference speed V.

Second Variation of Second Embodiment

A description will be given, with reference to FIG. 15, of a load abnormality detection process according to a second variation of the second embodiment. The load abnormality detection process according to the second variation is basically the same as the load abnormality detection process according to the first variation except that a fifth threshold value A' and a sixth threshold value B' are set in the second variation. The fifth threshold value A' is slightly larger than the first threshold value A, and the sixth threshold value B' is slightly smaller than the second threshold value.

By setting the fifth threshold value A' and the sixth threshold value B', the normal range of the first torque command value (mentioned in relation to the relational expression (11)) is narrowed. The narrowed normal range is referred to as a second normal range. In the second variation, if the first comparison part 3402 (refer to FIG. 5) judges that the first torque command value is out of the second range, the abnormality detection part 3406 identifies that there is a preindication of generation of the above-mentioned four load abnormalities.

FIG. 15A illustrates a case where the first comparison part 3402 judges that the first torque command value is smaller than the fifth threshold value A' and the second comparison part 3404 judges that the second torque command value is not larger than the third threshold value C. In this case, the load abnormality detection apparatus 340 sends to the main control part 310 an abnormality notification signal indicating that "there is a preindication of the first peculiar cause (refer to the description of FIG. 13A) peculiar to the primary transfer belt 220".

FIG. 15B illustrates a case where the first comparison part 3402 judges that the first torque command value is larger than sixth threshold value B' and the second comparison part 3404 judges that the second torque command value is larger than the third threshold value C. In this case, the load abnormality detection apparatus 340 sends to the main control part 310 an abnormality notification signal indicating that "there is a preindication of "movement together" of the primary transfer belt 220 caused by the secondary roller 270 (refer to the description of FIG. 13B)".

Figure 15D:
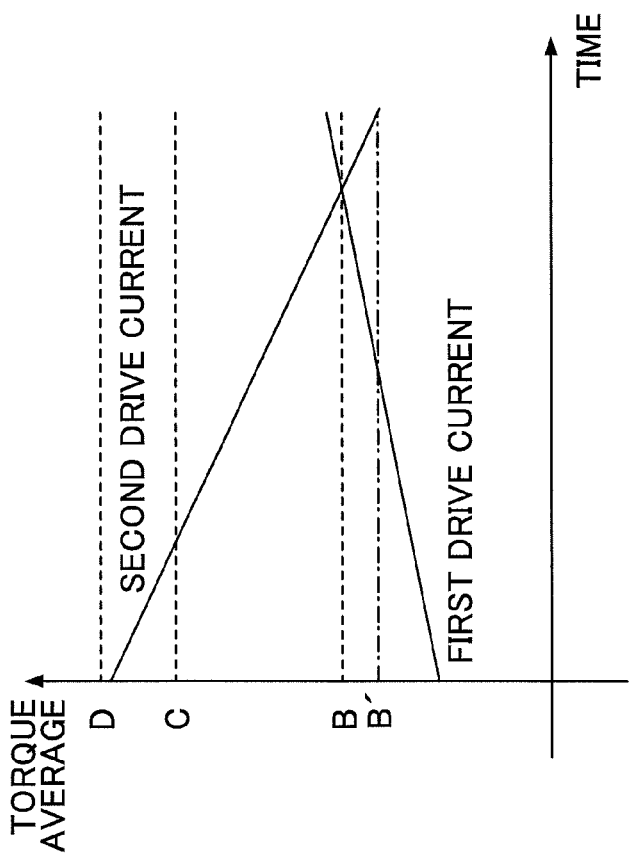
Figure 15C:
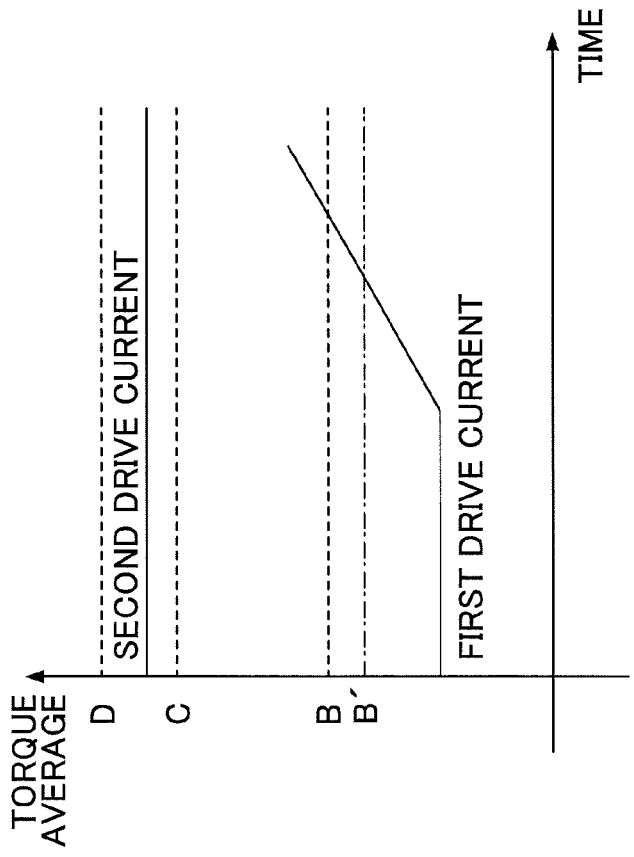

FIG. 15C illustrates a case where the first comparison part 3402 judges that the first drive current is larger than the sixth threshold value B' and the second comparison part 3404 judges that the second drive current is larger than the third threshold value C. In this case, the load abnormality detection apparatus 340 sends to the main control part 310 an abnormality notification signal indicating that "there is a preindication of the second peculiar cause (refer to the description of FIG. 13C) peculiar to the primary transfer belt 220".

FIG. 15D illustrates a case where the first comparison part 3402 judges that the first torque command value is larger than sixth threshold value B' and the second comparison part 3404 judges that the second torque command value is smaller than the third threshold value C. In this case, the load abnormality detection apparatus 340 sends to the main control part 310 an abnormality notification signal indicating that "there is a preindication of "movement together" of the secondary transfer roller 270 caused by the primary transfer belt 220 (refer to the description of FIG. 13D)".

According to the above-mentioned second variation, a notification of a preindication of various abnormalities can be sent to the main control part 310 of the image forming apparatus 100. Thus, measures can be taken before an abnormality is generated in an output image, which reduces a downtime of an entire system.

(Load Abnormality Detection Program)

Figure 16:
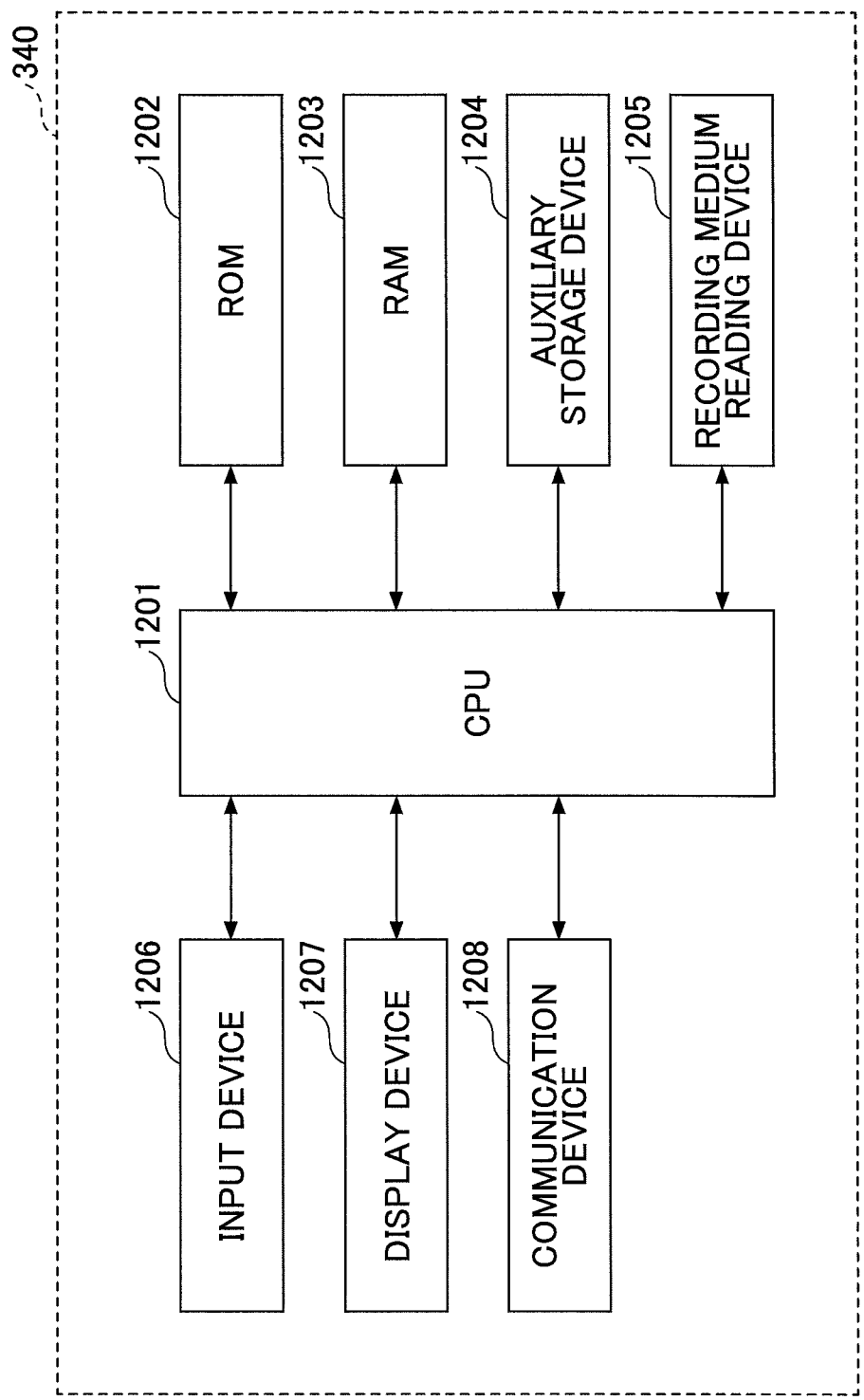
FIG. 16 is a block diagram of a hardware structure of a load abnormality detection apparatus according to an embodiment of the present invention.

FIG. 16 is a block diagram of a hardware structure of a load abnormality detection apparatus according to an embodiment of the present invention. The load abnormality detection apparatus includes a CPU 1201, a ROM (Read Only Memory) 1202, a RAM (Random Access Memory) 1203, an auxiliary storage device 1204, a recording medium reading device 1205, an input device 1206, a display device 1207 and a communication device 1208.

The CPU 1201 includes a microprocessor and peripheral circuits thereof to control the entire load abnormality detection apparatus. The ROM 1202 is a memory to store predetermined control programs (software parts) executed by the CPU 1202.

The RAM 1203 is used as a work area when the CPU 1201 executes the programs stored in the ROM 1202 to perform various controls.

The auxiliary storage device 1204 is a device to store various sets of information including information regarding a project such as task information. For example, an HDD (hard Disk Drive), which is a non-volatile memory, is used as the auxiliary storage device 1204. It should be noted that the above-mentioned various sets of information may be stored in a recording medium such as a CD-ROM (Compact Disk-Read Only Memory), a DVD (Digital Versatile Disk), or other computer readable recording media other than the auxiliary storage device 1204. Various sets of information stored in the recording media are read by a drive device such as the recording medium reading device 1205. Accordingly, various sets of information can be acquired by setting a recording medium in the recording medium reading device 1205. The input device 1206 is a device operated by a user to input instructions and information. The input device 1206 includes a mouse, a keyboard, a touch panel key displayed on a display screen of the display device 1207, etc.

In the load abnormality detection apparatus having the above-mentioned structure, a load abnormality program is executed by the CPU 1202 to perform the above-mentioned load abnormality detection process. The load abnormality detection program is previously stored in the ROM 1202. Alternatively, the load abnormality detection program is stored in a computer-readable recording medium. The load abnormality detection program stored in the computer-readable recording medium is read by the recording medium reading device 1205, and is stored in the RAM 1203 and executed by the CPU 1201.

The present invention is not limited to the specifically disclosed embodiments, and variations and modifications may be made without departing from the scope of the present invention.

What is claimed is:

1. A load abnormality detection apparatus, comprising:
   first and second rotational members that contact each other directly or via a recording medium interposed therebetween;
   a first rotational speed information output part configured to output first rotational speed information according to a rotation of the first rotational member;
   a first motor that drives said first rotational member and is controlled by a first drive current determined according to the first rotational speed information;
   a second rotational speed information output part configured to output second rotational speed information according to a rotation of the second rotational member; and
   a second motor that drives said second rotational member and is controlled by a second drive current determined according to the second rotational speed information,
   said load abnormality detection apparatus further comprising:
   a first current detection part configured to detect the first drive current;
   a second current detection part configured to detect the second drive current;
   a first judgment part configured to judge whether said first drive current is within a first range;
   a second judgment part configured to judge whether said second drive current is within a second range; and
   an abnormality detection part configured to detect a load abnormality of at least one of the first and second rotational members and identify a cause of the load abnormality based on results from the first and second judgment parts.

2. The load abnormality detection apparatus as claimed in claim 1, wherein, when said first drive current is smaller than said first range and the second drive current is within the second range or smaller than the second range, the abnormality detection part identifies the cause of said load abnormality as a first peculiar cause of said first rotational member.

3. The load abnormality detection apparatus as claimed in claim 1, wherein, when said first drive current is smaller than said first range and the second drive current is greater than the second range, the abnormality detection part identifies the cause of said load abnormality as a rotational movement of said first rotational member together with the second rotational member.

4. The load abnormality detection apparatus as claimed in claim 3, further comprising an adjustment part configured to adjust a speed of said second rotational member to a reference speed when said abnormality detection part identifies the cause of said load abnormality as the rotational movement of said first rotational member together with the second rotational member, the reference speed being a speed of said second rotational member when said first rotational member does not move together with the second rotational member.

5. The load abnormality detection apparatus as claimed in claim 1, wherein, when said first drive current is greater than said first range and the second drive current is within the second range or greater than the second range, the abnormality detection part identifies the cause of said load abnormality as a second peculiar cause of said first rotational member.

6. The load abnormality detection apparatus as claimed in claim 1, wherein, when said first drive current is greater than said first range and the second drive current is smaller than the second range, the abnormality detection part identifies the cause of said load abnormality as a rotational movement of said second rotational member together with the first rotational member.

7. The load abnormality detection apparatus as claimed in claim 6, further comprising an adjustment part configured to adjust a speed of said second rotational member to a reference speed when said abnormality detection part identifies the cause of said load abnormality as the rotational movement of said second rotational member together with the first rotational member, the reference speed being a speed of said second rotational member when said second rotational member does not move together with the first rotational member.

8. A load abnormality detection apparatus, comprising:
first and second rotational members that contact each other directly or via a recording medium interposed therebetween;
a first rotational speed information output part configured to output first rotational speed information according to a rotation of the first rotational member;
a first motor that drives said first rotational member and is controlled by a first torque command value determined according to the first rotational speed information;
a second rotational speed information output part configured to output second rotational speed information according to a rotation of the second rotational member; and
a second motor that drives said second rotational member and is controlled by a second torque command value determined according to the second rotational speed information,
said load abnormality detection apparatus further comprising:
a first judgment part configured to judge whether said first torque command value is within a first range;
a second judgment part configured to judge whether said second torque command value is within a second range; and
an abnormality detection part configured to detect a load abnormality of at least one of the first and second rotational members and identify a cause of the load abnormality based on results from the first and second judgment parts.

9. The load abnormality detection apparatus as claimed in claim 8, wherein, when said first torque command value is smaller than said first range and the second torque command value is within the second range or smaller than the second range, the abnormality detection part identifies the cause of said load abnormality as a first peculiar cause of said first rotational member.

10. The load abnormality detection apparatus as claimed in claim 8, wherein, when said first torque command value is smaller than said first range and the second torque command value is greater than the second range, the abnormality detection part identifies the cause of said load abnormality as a rotational movement of said first rotational member together with the second rotational member.

11. The load abnormality detection apparatus as claimed in claim 10, further comprising an adjustment part configured to adjust a speed of said second rotational member to a reference speed when said abnormality detection part identifies the cause of said load abnormality as the rotational movement of said first rotational member together with the second rotational member, the reference speed being a speed of said second rotational member when said first rotational member does not move together with the second rotational member.

12. The load abnormality detection apparatus as claimed in claim 8, wherein, when said first torque command value is greater than said first range and the second torque command value is within the second range or greater than the second range, the abnormality detection part identifies the cause of said load abnormality as a second peculiar cause of said first rotational member.

13. The load abnormality detection apparatus as claimed in claim 8, wherein, when said first torque command value is greater than said first range and the second torque command value is smaller than the second range, the abnormality detection part identifies the cause of said load abnormality as a rotational movement of said second rotational member together with the first rotational member.

14. The load abnormality detection apparatus as claimed in claim 13, further comprising an adjustment part configured to adjust a speed of said second rotational member to a reference speed when said abnormality detection part identifies the cause of said load abnormality as the rotational movement of said second rotational member together with the first rotational member, the reference speed being a speed of said second rotational member when said second rotational member does not move together with the first rotational member.

15. An image forming apparatus, comprising
the load abnormality detection apparatus as claimed in claim 1, and
first and second transfer belt members, wherein the first motor is configured to drive the first transfer belt member, and the second motor is configured to drive the second transfer belt member.

16. An Image forming apparatus, comprising
the load abnormality detection apparatus as claimed in claim 8, and
first and second transfer belt members, wherein the first motor is configured to drive the first transfer belt member, and the second motor is configured to drive the second transfer belt member.

17. A load abnormality detection method for detecting a load abnormality in a load applied to at least one of first and second rotational members provided in an apparatus including:

first and second rotational members that contact each other directly or via a recording medium interposed therebetween;

a first rotational speed information output part configured to output first rotational speed information according to a rotation of the first rotational member;

a first motor that drives said first rotational member and is controlled by a first drive current determined according to the first rotational speed information;

a second rotational speed information output part configured to output second rotational speed information according to a rotation of the second rotational member; and a second motor that drives said second rotational member and is controlled by a second drive current determined according to the second rotational speed information, said method including the steps of:

detecting the first drive current by a first current detection part and the second drive current by a second current detection part;

first judging whether said first drive current is within a first range;

second judging whether said second drive current is within a second range; and detecting the load abnormality of at least one of the first and second rotational members and identifying a cause of the load abnormality based on results from the first and second judging steps.

18. A non-transitory computer readable recording medium storing a program to cause a computer to perform the abnormality detection method as claimed in claim 17.

* * * * *